United States Patent
Cheng

(10) Patent No.: US 11,758,487 B2
(45) Date of Patent: Sep. 12, 2023

(54) ELECTRIC POWER BALANCE PROCESSING METHOD AND APPARATUS, SYSTEM, DEVICE AND STORAGE MEDIUM

(71) Applicant: BOE TECHNOLOGY GROUP CO., LTD., Beijing (CN)

(72) Inventor: Xinyi Cheng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 161 days.

(21) Appl. No.: 17/425,084

(22) PCT Filed: Jan. 22, 2021

(86) PCT No.: PCT/CN2021/073174
§ 371 (c)(1),
(2) Date: Jul. 22, 2021

(87) PCT Pub. No.: WO2021/164491
PCT Pub. Date: Aug. 26, 2021

(65) Prior Publication Data
US 2022/0322244 A1 Oct. 6, 2022

(30) Foreign Application Priority Data
Feb. 20, 2020 (CN) .......................... 202010106510.2

(51) Int. Cl.
*H04W 40/10* (2009.01)
*H04W 52/34* (2009.01)
*G06K 19/07* (2006.01)

(52) U.S. Cl.
CPC ...... *H04W 52/346* (2013.01); *G06K 19/0715* (2013.01); *H04W 40/10* (2013.01)

(58) Field of Classification Search
CPC . H04W 52/346; H04W 40/10; G06K 19/0715
See application file for complete search history.

(56) References Cited

U.S. PATENT DOCUMENTS 9,363,765 B2 * 6/2016 Kazmi ............... H04W 52/367
9,549,405 B2 * 1/2017 Shu .................... H04W 52/0216
(Continued)

FOREIGN PATENT DOCUMENTS

CN 101499672 A * 8/2009 .......... B60L 11/1879
CN 103209468 A 7/2013
(Continued)

OTHER PUBLICATIONS

"First Office Action and English language translation", CN Application No. 202010106510.2, dated Apr. 22, 2021, 19 pp.
(Continued)

*Primary Examiner* — Hai V Nguyen
(74) *Attorney, Agent, or Firm* — Myers Bigel, P.A.

(57) ABSTRACT

The present disclosure provides an electric power balance processing method applied to a network system including a communication device and a plurality of terminal electronic devices, wherein each terminal electronic device can communicate with the communication device, and the terminal electronic devices also communicate with each other. The method includes: acquiring remaining electric power of each terminal electronic device; determining an abnormal power-consuming device in the network system based on the remaining electric power of each terminal electronic device; determining a relay device and a device to be relayed from the plurality of terminal electronic devices based on the abnormal power-consuming device; using the relay device to construct a relay transmission channel for data transmission between the device to be relayed and the communication device. Furthermore, the present disclosure also provides a corresponding electric power balance processing device, a network system, a computing device, and a computer-readable storage medium thereof.

20 Claims, 8 Drawing Sheets

(56) References Cited

U.S. PATENT DOCUMENTS

| | | | |
|---|---|---|---|
| 9,801,137 B2* | 10/2017 | Ree | H04W 52/0296 |
| 9,893,982 B2* | 2/2018 | Kobayashi | H04L 45/02 |
| 9,913,209 B2* | 3/2018 | Calcev | H04W 28/10 |
| 10,536,039 B2* | 1/2020 | Haartsen | H02J 13/00007 |
| 10,652,136 B2* | 5/2020 | Wei | H04W 40/12 |
| 11,076,446 B2* | 7/2021 | Lee | H04W 76/27 |
| 11,156,641 B2* | 10/2021 | Takeya | H02J 13/00026 |
| 11,343,766 B2* | 5/2022 | Gan | H04W 72/12 |
| 11,540,171 B2* | 12/2022 | Raghavan | H04W 28/06 |
| 2007/0161352 A1* | 7/2007 | Dobrowski | H04W 40/10 455/69 |
| 2007/0165545 A1* | 7/2007 | Dobrowski | H04W 52/0225 370/254 |
| 2009/0218886 A1* | 9/2009 | Halfon | H01H 47/002 361/187 |
| 2014/0133355 A1* | 5/2014 | Shu | H04W 40/246 370/254 |
| 2014/0349663 A1* | 11/2014 | Shu | H04W 74/006 455/450 |
| 2015/0236947 A1* | 8/2015 | Kobayashi | H04W 40/10 370/254 |
| 2016/0241999 A1* | 8/2016 | Chin | G07C 9/00182 |
| 2017/0207819 A1* | 7/2017 | Dent | H04L 12/2838 |
| 2018/0167308 A1* | 6/2018 | Wei | H04L 45/22 |
| 2018/0288822 A1* | 10/2018 | Lee | H04W 52/0209 |
| 2019/0109891 A1* | 4/2019 | Paruchuri | H04L 9/40 |
| 2019/0181690 A1* | 6/2019 | Haartsen | H02J 7/0024 |
| 2019/0223257 A1* | 7/2019 | Han | H04W 40/04 |
| 2020/0014206 A1* | 1/2020 | Haartsen | H02J 3/381 |
| 2020/0107397 A1* | 4/2020 | Lee | H04W 40/18 |
| 2020/0409323 A1* | 12/2020 | Spalt | G05B 13/0265 |
| 2021/0092797 A1* | 3/2021 | Miyamoto | H04W 8/005 |
| 2021/0132117 A1* | 5/2021 | Takeya | G01R 21/00 |
| 2021/0392579 A1* | 12/2021 | Liu | H04W 76/40 |
| 2022/0116868 A1* | 4/2022 | Chen | H04W 52/0216 |
| 2022/0294217 A1* | 9/2022 | Spalt | G06F 18/214 |

FOREIGN PATENT DOCUMENTS

| | | | | |
|---|---|---|---|---|
| CN | 106028398 A | | 10/2016 | |
| CN | 104780580 B | | 6/2018 | |
| CN | 108632941 A | | 10/2018 | |
| CN | 111315006 A | | 6/2020 | |
| EP | 4087081 A1 * | | 11/2022 | H02J 3/00 |
| WO | 2017156836 A1 | | 9/2017 | |
| WO | 2018182373 A1 | | 10/2018 | |
| WO | WO-2019008707 A1 * | | 1/2019 | H04W 52/02 |

OTHER PUBLICATIONS

"International Search Report and English language translation", International Application No. PCT/CN2021/073174, dated Apr. 16, 2021, 5 pp.

"Notice of Second Review Opinion and English language translation", CN Application No. 202010106510.2, dated Sep. 28, 2021, 20 pp.

* cited by examiner

ELECTRIC POWER BALANCE PROCESSING METHOD AND APPARATUS, SYSTEM, DEVICE AND STORAGE MEDIUM

RELATED APPLICATIONS

The present application is a 35 U.S.C. 371 national stage application of PCT International Application No. PCT/CN2021/073174, filed on Jan. 22, 2021, which claims the benefits of Chinese Patent Applications Nos. 202010106510.2, filed on Feb. 20, 2020, the entire disclosures of which are incorporated herein by reference.

TECHNICAL FIELD

The present disclosure generally relates to the technical field of wireless network technology, and in particular to an electric power balance processing method and apparatus, a network system, a computing device, and a computer readable storage medium.

BACKGROUND

An electronic tag is an electronic device that can wirelessly acquire data information of a target object, and can store, display and send the data information. As a non-limiting example, the electronic tag may be a radio frequency tag based on radio frequency identification technology. Generally speaking, electronic tags can communicate wirelessly and are powered by batteries. The application fields of electronic tags are extremely wide, for example, but not limited to, displaying information about corresponding commodities and goods at specific positions on commodity shelves in shopping malls and supermarkets, and displaying patients and related medical information at hospital beds (such as at a bedside). In various application scenarios, multiple electronic tags are applied in the form of wireless networking. Generally speaking, the content carried by an electronic tag needs to be updated frequently. For example, but not limited to, the data information to be updated can be received from a communication device such as a gateway device through wireless communication. According to the usage of electronic tags in a specific application scenario, different electronic tags are updated at different frequencies. For example, if a certain commodity sells quickly, the update frequency of the carrying data of the corresponding electronic tag is high. This will cause the electric power consumption of multiple electronic tags in the same network system to be different, which in turn leads to the problem of power imbalance among the electronic tags in the network system. In addition, it is easy to understand that in any network system composed of multiple terminal electronic devices powered by batteries, similar electric power imbalance problems may also exist.

SUMMARY

In view of the above-mentioned shortcomings or deficiencies in the prior art, it is desirable to provide an electric power balance processing method and apparatus, system, device and storage medium, which can solve the above problems and balance the electric power of each terminal electronic device in the network system, to effectively extend the service life of the entire network system.

According to an aspect of the present disclosure, there is provided an electric power balance processing method applied to a network system comprising a communication device and a plurality of terminal electronic devices, wherein each terminal electronic device can communicate with the communication device, and the terminal electronic devices can also communicate with each other, comprising steps: acquiring remaining electric power of each terminal electronic device; determining an abnormal power-consuming device in the network system based on the remaining electric power of each terminal electronic device; determining a relay device and a device to be relayed from the plurality of terminal electronic devices based on the abnormal power-consuming device; using the relay device to construct a relay transmission channel for data transmission between the device to be relayed and the communication device.

In some exemplary embodiments, the step of determining an abnormal power-consuming device in the network system based on the remaining electric power of each terminal electronic device comprises steps: determining a first threshold that is greater than an average value of the remaining electric power of the plurality of terminal electronic devices; determining a power-rich terminal electronic device with remaining electric power greater than the first threshold among the plurality of terminal electronic devices as the abnormal power-consuming device.

In some exemplary embodiments, the step of determining a relay device and a device to be relayed from the plurality of terminal electronic devices based on the abnormal power-consuming device comprises steps: determining the power-rich terminal electronic device as the relay device; determining the device to be relayed from the other terminal electronic devices among the plurality of terminal electronic devices excluding the power-rich terminal electronic device.

In some exemplary embodiments, the step of determining the device to be relayed from the other terminal electronic devices among the plurality of terminal electronic devices excluding the power-rich terminal electronic device comprises: the device to be relayed satisfies at least one of the following conditions: the lowest remaining electric power; the lowest power consumption required for communication with the relay device; the shortest transmission time required for communication with the relay device; and the shortest transmission path required for communication with the relay device.

In some exemplary embodiments, the step of determining an abnormal power-consuming device in the network system based on the remaining electric power of each terminal electronic device comprises steps: determining a second threshold that is less than an average value of the remaining electric power of the plurality of terminal electronic devices; determining a power-deficient terminal electronic device with remaining electric power less than the second threshold among the plurality of terminal electronic devices as the abnormal power-consuming device.

In some exemplary embodiments, the step of determining a relay device and a device to be relayed from the plurality of terminal electronic devices based on the abnormal power-consuming device comprises steps: determining the power-deficient terminal electronic device as the device to be relayed; determining the relay device from the other terminal electronic devices among the plurality of terminal electronic devices excluding the power-deficient terminal electronic device.

In some exemplary embodiments, the step of determining the relay device from the other terminal electronic devices among the plurality of terminal electronic devices excluding the power-deficient terminal electronic device comprises: the relay device satisfies at least one of the following conditions: the highest remaining electric power; the lowest power consumption required for communication with the device to be relayed; the shortest transmission time required for communication with the device to be relayed; and the shortest transmission path required for communication with the device to be relayed.

In some exemplary embodiments, the electric power balance processing method further comprises reducing transmitting power of the device to be relayed.

In some exemplary embodiments, the step of determining a relay device and a device to be relayed from the plurality of terminal electronic devices based on the abnormal power-consuming device comprises determining more than one relay device from the plurality of terminal electronic devices, wherein step of using the relay device to construct a relay transmission channel for data transmission between the device to be relayed and the communication device comprises using the more than one relay device to construct the relay transmission channel in a cascaded form.

In some exemplary embodiments, the step of determining a relay device and a device to be relayed from the plurality of terminal electronic devices based on the abnormal power-consuming device comprises determining more than one relay device from the plurality of terminal electronic devices, wherein step of using the relay device to construct a relay transmission channel for data transmission between the device to be relayed and the communication device comprises using each relay device among the more than one relay device in turn to construct the relay transmission channel.

According to another aspect of the present disclosure, there is provided an electric power balance processing apparatus applied to a network system comprising a communication device and a plurality of terminal electronic devices, wherein each terminal electronic device can communicate with the communication device, and the terminal electronic devices can also communicate with each other, comprising: a remaining electric power acquisition module configured to acquire the remaining electric power of each terminal electronic device; an abnormal power-consuming device determination module configured to determine the abnormal power-consuming device in the network system based on the remaining electric power of each terminal electronic device; a relay transmission related devices determination module configured to determine a relay device and a device to be relayed from the plurality of terminal electronic devices based on the abnormal power-consuming device; a relay transmission channel construction module configured to use the relay device to construct a relay transmission channel for data transmission between the device to be relayed and the communication device.

According to another aspect of the present disclosure, there is provided a network system comprising: a communication device and a plurality of terminal electronic devices, wherein each terminal electronic device can communicate with the communication device, and the terminal electronic devices can also communicate with each other; wherein, the communication device is configured to: acquire remaining electric power of each terminal electronic device; determine an abnormal power-consuming device in the network system based on the remaining electric power of each terminal electronic device; determine a relay device and a device to be relayed from the plurality of terminal electronic devices based on the abnormal power-consuming device; use the relay device to construct a relay transmission channel for data transmission between the device to be relayed and the communication device.

In some exemplary embodiments, the network system further comprises a server configured to receive data sent by the communication device and transmit server data to the communication device, wherein the communication device transmits the server data to each terminal electronic device respectively.

According to another aspect of the present disclosure, there is provided a computing device comprising a memory and a processor, wherein a computer program that can be run on the processor is stored on the memory, wherein the computer program, when run by the processor, implements the electric power balance processing method as described hereinabove.

According to yet another aspect of the present disclosure, there is provided a computer readable storage medium having a computer program stored thereon, wherein the computer program, when run by a processor, implements the electric power balance processing method as described hereinabove.

The electric power balance processing method provided according to the exemplary embodiment of the present disclosure dynamically determines whether there is an abnormal power-consuming device in the network system based on the remaining power of the terminal electronic devices; when there is an abnormal power-consuming device, determines a relay device and a device to be relayed from the plurality of terminal electronic devices; and use the relay device to construct a relay transmission channel for data transmission between the device to be relayed and the communication device. As a result, the electric power balance processing method according to the present disclosure changes the network topology of the network system, so that the plurality of terminal electronic devices in the network system are in an electric power balance state, thereby extending the overall service life of the network system. In addition, the electric power balance processing method provided according to the exemplary embodiments of the present disclosure can also reduce the transmitting power of the terminal electronic device as the device to be relayed, so as to be more beneficial to make the plurality of terminal electronic devices in the network system in an electric power balance state, to further extend the service life of the network system

BRIEF DESCRIPTION OF DRAWINGS

Hereinafter, by reading the detailed description of the non-limiting embodiments with reference to the following drawings, other features, purposes and advantages of the present disclosure will become clear; in the drawings.

Figure 1:
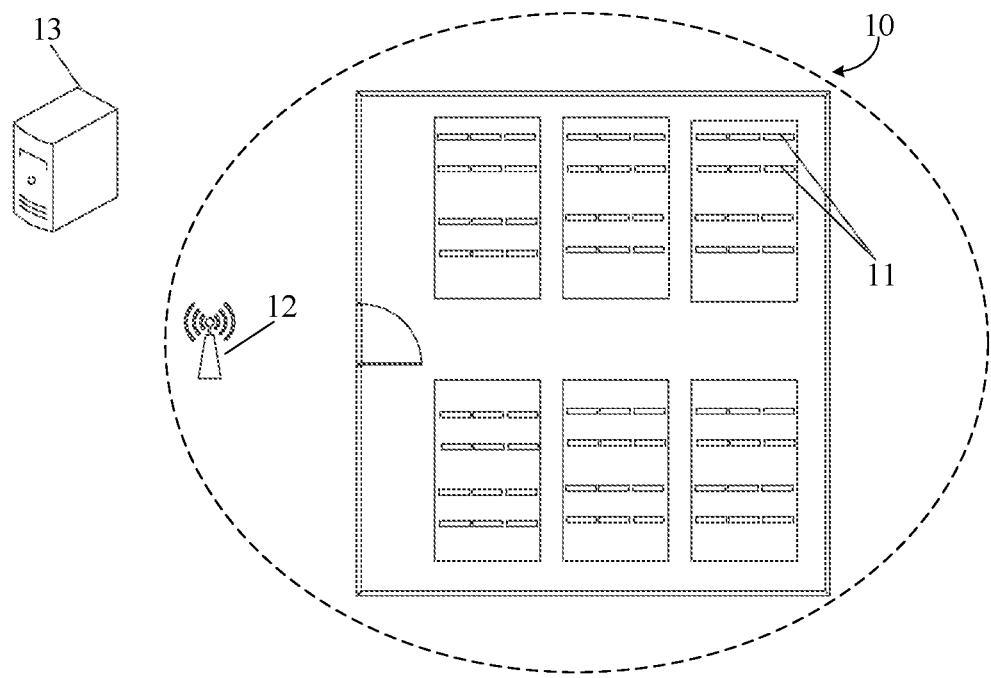
FIG. 1 schematically shows an exemplary application scenario related to the power balance processing method provided according to an exemplary embodiment of the present disclosure.

It should be noted that the contents shown in the drawings are merely schematic, and therefore they need not be drawn to scale. In addition, throughout the drawings, the same features are indicated by the same reference signs.

DETAILED DESCRIPTION OF EMBODIMENTS

The present disclosure will be further described in detail hereinafter with reference to the accompanying drawings and exemplary embodiments. It should be understood that the exemplary embodiments described hereinafter are only used to explain the relevant disclosure, but not to limit the disclosure. In addition, it should be noted that, for ease of description, only the parts related to the explained content are shown in the drawings.

It should be noted that, in the case of no conflict, each exemplary embodiment in the present disclosure and the features in each exemplary embodiment can be combined with each other. Hereinafter, the present disclosure will be described in detail with reference to the accompanying drawings and in conjunction with each exemplary embodiment.

Referring to FIG. 1, it schematically shows an exemplary application scenario related to the electric power balance processing method provided according to an exemplary embodiment of the present disclosure. As shown in FIG. 1, the application scenario includes a plurality of terminal electronic devices 11, a communication device 12 and a server 13. The server 13 and the communication device 12 can communicate with each other, the communication device 12 and each terminal electronic device 11 can communicate with each other, and the terminal electronic devices 11 can also communicate with each other. In the present disclosure, the expression "can communicate" means that related devices can at least send and receive data via a specific data transmission channel. In this way, a plurality of terminal electronic devices 11 and communication devices 12 can form a network system 10 together. It should be understood that the network system 10 shown in FIG. 1 is only exemplary, and it may also include any other suitable devices. For example, the network system 10 may further include a server 13.

As a non-limiting example, the terminal electronic device 11 may be an active electronic tag, an energy-consuming collection terminal, etc., but may also be any other suitable terminal electronic device powered by a electric power source; the communication device 12 may be a device such as a gateway device, but it can also be any other suitable device that can be used for data transmission. In a non-limiting example, the energy consumption collection terminal may be a monitoring terminal or the like. An active electronic tag can be powered by its internal battery, and an active electronic tag can actively emit electromagnetic signals, and its identification distance is long, usually up to tens of meters or even hundreds of meters, but the disadvantage is that its cost is high and its lifespan is limited. The energy consumption of an active electronic tag is related to its tag transmitting power. The tag transmitting power refers to the energy of the signal transmitted by the tag, which is generally expressed in power units of watts (W) or decibel milliwatts (dBm). The higher the tag transmitting power of an active electronic tag, or the more times it transmits, the greater its energy consumption and the shorter its lifespan.

The communication device 12 can be used to forward service data and control instructions etc. provided by the server 13 to the plurality of terminal electronic devices 11 respectively, or can receive uplink data from the plurality of terminal electronic devices 11 and forward the uplink data to the server 13. The communication device 12 may be, for example, a gateway device, which is also referred to as an internet connector or a protocol converter. The gateway device can realize network interconnection on a network layer. It is a complex network interconnection device and is only used for the interconnection of two networks with different high-level protocols. The terminal electronic devices 11 and the communication device 12 can perform data transmission through wireless communication.

The server 13 can be used to send downlink data to the communication device 12, and the downlink data is sent to the terminal electronic devices 11 via the communication device 12, or the server 13 can receive the uplink data uploaded by the terminal electronic devices 11 via the communication device 12. The server 13 and the communication device 12 may be implemented as one piece, but the server 13 may also be a separate device from the communication device 12. It should be understood that the server may be a single server or a server cluster or a cloud server. The server can be an independent physical server, or a server cluster or distributed system composed of multiple physical servers. The server may also be a cloud server that provides cloud services, cloud databases, cloud computing, cloud functions, cloud storage, network services, cloud communications, middleware services, domain name services, security services, CDN, and basic cloud computing services such as big data and artificial intelligence platforms.

Figure 2:
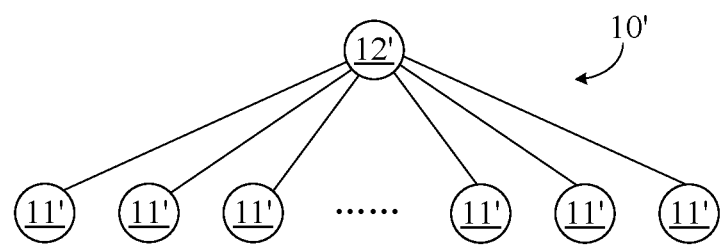
FIG. 2 schematically shows the network topology structure of the network system 0 shown in FIG. 1.

Referring to FIG. 2, it schematically shows the network topology 10' of the network system 10 formed by the communication device 12 and a plurality of terminal electronic devices 11 in FIG. 1. The network topology 10' may include a plurality of nodes 11' and a central node 12'. The node 11' may represent the terminal electronic device 11 in FIG. 1, and the central node 12' may represent the communication device 12 in FIG. 1. As shown in FIG. 2, each node 11' can directly communicate with the central node 12'. Therefore, the network topology 10' is a star topology.

The electric power balance processing method provided according to the exemplary embodiment of the present disclosure can temporarily change the network topology of the network system 10 and/or temporarily reduce the transmitting power of the corresponding terminal electronic device 11 (for example, for an active electronic tag, temporarily reduce its tag transmitting power), so that each terminal electronic device 11 in the network system 10 is in an electric power balance state. It should be noted that, as a non-limiting example, the electric power balance method can be executed by an electric power balance processing apparatus as the execution subject, and the apparatus can be integrated on the communication device 12 (for example, a gateway device), or can also be integrated on a server. In addition, the apparatus can be a hardware module or a software module. However, it should be understood that the electric power balance processing method provided according to the exemplary embodiment of the present application may also be implemented by any suitable computing device, for example, it may be implemented through the cooperation of a server and a communication device.

Hereinafter, in combination with the above application scenarios, the electric power balance processing method provided according to the exemplary embodiment of the present disclosure will be described. Please referring to FIG. 3, it schematically shows an electric power balance processing method 200 provided according to an exemplary embodiment of the present disclosure in the form of a flowchart. As a non-limiting example, the electric power balance processing method 200 may be executed by an electric power balance processing apparatus, and may be applied to the network system 10 shown in FIG. 1. However, it should be understood that the electric power balance processing method 200 can also be implemented or executed by any other suitable computing device. The electric power balance processing method 200 includes the following steps:

step 210: acquiring remaining electric power of each terminal electronic device;

step 220: determining an abnormal power-consuming device in the network system based on the remaining electric power of each terminal electronic device;

step 230: determining a relay device and a device to be relayed from the plurality of terminal electronic devices based on the abnormal power-consuming device;

step 240: using the relay device to construct a relay transmission channel for data transmission between the device to be relayed and the communication device.

In step 210, the remaining electric power of each terminal electronic device 11 may be the information that the terminal electronic device 11 actively reports to the electric power balance processing apparatus according to a preset time period, it may also be the information that each terminal electronic device 11 reports to the electric power balance processing apparatus after receiving the electric power acquisition request that is broadcasted to each terminal electronic device 11 by the electric power balance processing apparatus. It should be understood that the remaining electric power may be a specific value of electric power or a percentage value of the remaining electric power of the battery.

In step 220, the electric power balance processing method 200 may determine the abnormal power-consuming device based on the remaining electric power of each terminal electronic device 11. The abnormal power-consuming device is a terminal electronic device of the terminal electronic devices 11 of the network system 10 that has a significant difference in the remaining electric power compared to the remaining electric power of other terminal electronic devices 11. As a non-limiting example, the average value of the remaining electric power (i.e., the average remaining electric power) of the plurality of terminal electronic devices 11 in the network system 10 may be used as a basis for determining whether the remaining electric power of one terminal electronic device 11 is abnormal. For example, when the differences between the remaining electric power of all terminal electronic devices 11 and the average remaining electric power are within a predetermined range, it can be considered that there is no abnormal power-consuming device in the network system 10, so the remaining electric power of each terminal electronic device 11 in the network system 10 reaches a balanced value. When the difference(s) between the remaining electric power of one or more terminal electronic devices 11 of the network system 10 and the average remaining electric power is/are outside the predetermined range, it can be considered that there is/are the abnormal power-consuming device(s) in the network system 10, so the remaining electric power of each terminal electronic device 11 in the network system 10 doses not reach a balanced value. When the remaining electric power of each terminal electronic device 11 in the network system 10 is not in a balanced state, the electric power balancing processing method proposed according to the exemplary embodiment of the present disclosure temporarily changes the network topology of the network system 10, and/or temporarily reduces the transmitting power of the corresponding terminal electronic device 11, to make each terminal electronic device 11 in the network system 10 in an electric power balance state.

Since the remaining electric power of each terminal electronic device 11 in the network system 10 varies with time, determining whether there is an abnormal power-consuming device in the network system 10 based on the remaining electric power of the terminal electronic devices 11 is a dynamic process, whereby an abnormal state of the remaining electric power of each terminal electronic device 11 can be detected timely during the operation of the network system 10. The dynamic calculation of the average value of the remaining electric power of various terminal electronic devices 11 in the network system 10 may be triggered by the communication device 12 each time it receives the remaining electric power reported by the terminal electronic device 11; or, it may be calculated by the communication device 12 according to a preset time period. By comparing the remaining electric power of each terminal electronic device 11 with the dynamically acquired average remaining electric power of the network system 10, it is possible to identify whether the network system 10 has reached a state of electric power balance. When, at a certain moment, the remaining electric power of each terminal electronic device 11 is within a predetermined fluctuation range of the average remaining electric power of the network system 10, it can be considered that the network system 10 is in an electric power balance state at that moment.

Figure 3:
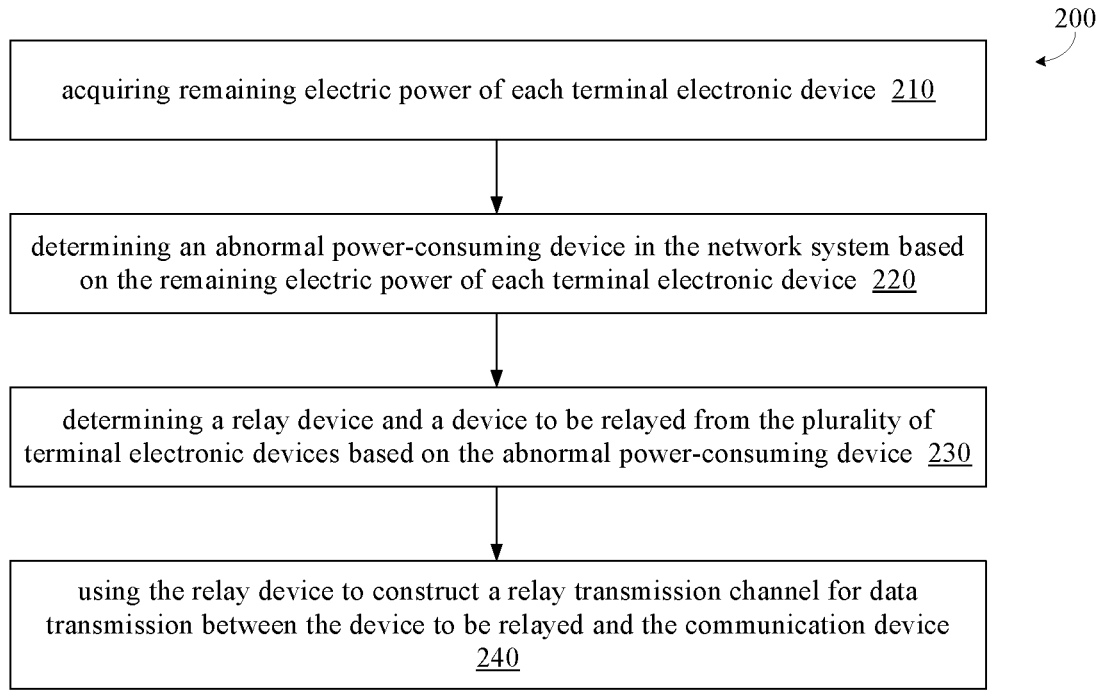
FIG. 3 schematically shows in the form of a flow chart an electric power balance processing method provided according to an exemplary embodiment of the present disclosure.
Figure 4:
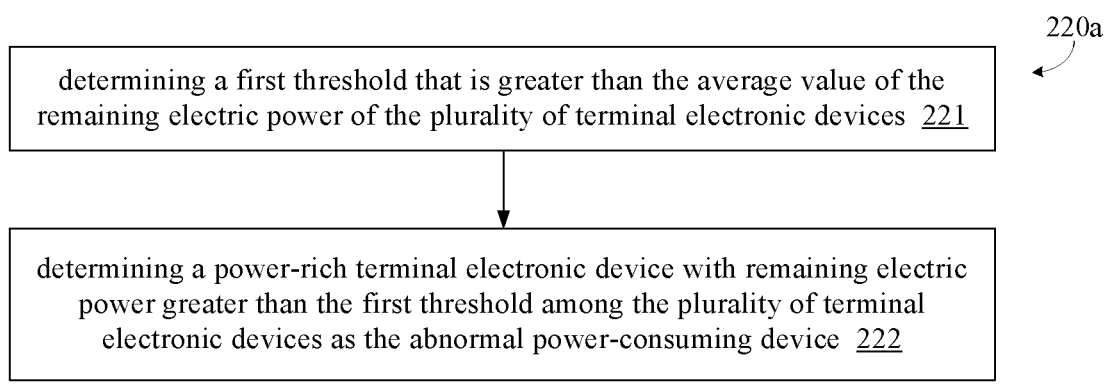
FIG. 4 schematically shows a method for determining an abnormal power-consuming device in the power balance processing method shown in FIG. 3 in the form of a flowchart.
Figure 5:
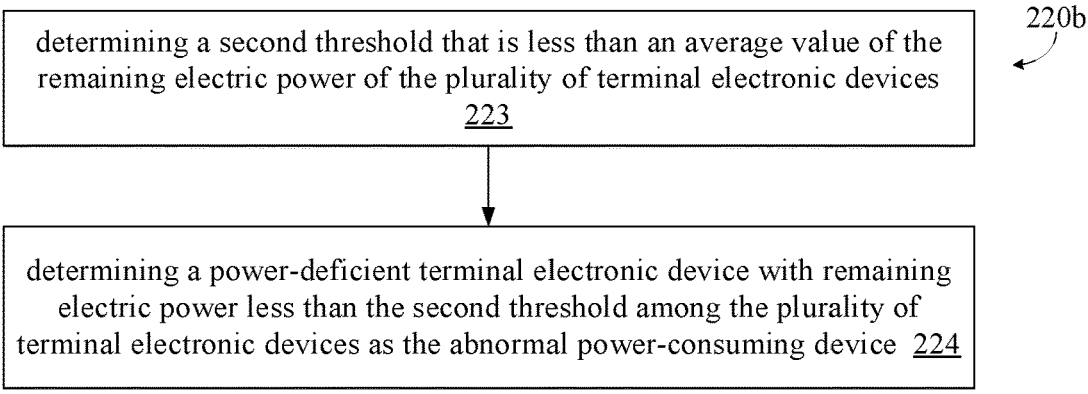
FIG. 5 schematically shows another method for determining an abnormal power-consuming device in the power balance processing method shown in FIG. 3 in the form of a flowchart.

Referring to FIGS. 4 and 5, they schematically illustrate in flowchart form, respectively, the methods 220a and 220b for determining an abnormal power-consuming device in step 220 of the electric power balance processing method 200 shown in FIG. 3. The method 220a includes steps 221 and 222:

step 221: determining a first threshold that is greater than the average value of the remaining electric power of the plurality of terminal electronic devices;

step 222: determining a power-rich terminal electronic device with remaining electric power greater than the first threshold among the plurality of terminal electronic devices as the abnormal power-consuming device.

The method 220b then includes steps 223 and 224:

step 223: determining a second threshold that is less than an average value of the remaining electric power of the plurality of terminal electronic devices;

step 224: determining a power-deficient terminal electronic device with remaining electric power less than the second threshold among the plurality of terminal electronic devices as the abnormal power-consuming device.

Both the method 220a and 220b determine whether the terminal electronic device 11 is an abnormal power-consuming device by acquiring an average value of the remaining electric power of the plurality of terminal electronic devices 11 in the network system 10, setting a threshold based on the average value, and comparing the remaining electric power of the terminal electronic device 11 with the threshold. The difference is that the method 220a is used to determine a power-rich terminal electronic device from the plurality of terminal electronic devices 11 and determine it as an abnormal power-consuming device, while the method 220b is used to determine a power-deficient terminal electronic device from the plurality of terminal electronic devices 11 and determine it as an abnormal power-consuming device. It should be understood that the power balance processing method 200 determines the relay device and the device to be relayed differently with respect to the power-rich terminal electronic device and the power-deficient terminal electronic device, as will be described in detail below.

In another non-limiting example according to the present disclosure, an average value of the remaining electric power of the plurality of terminal electronic devices 11 in the network system 10 may be acquired, a difference between the remaining electric power of each terminal electronic device 11 and the average value may be calculated, and a first threshold and/or a second threshold may be set accordingly based on the difference value for determining a power-rich terminal electronic device and/or a power-deficient terminal electronic device. When the remaining electric power of the terminal electronic device 11 is greater than the average value, determine whether the difference between the two is greater than the first threshold, and if it is greater than the first threshold, the terminal electronic device 11 is a power-rich terminal electronic device. When the remaining electric power of the terminal electronic device 11 is less than the average value, determine whether the difference between the two is greater than the second threshold, and if it is greater than the second threshold, the terminal electronic device 11 is a power-deficient terminal electronic device.

While the methods 220a and 220b for determining an abnormal power-consuming device in step 220 are schematically illustrated herein in the form of flowcharts in FIGS. 4 and 5, respectively, it should be understood that the methods 220a and 220b can also be used in combination. In this situation, the first threshold and the second threshold together set a reference range based on an average of the remaining electric power of the plurality of terminal electronic devices 11 in the network system 10, whereby the terminal electronic device 11 may be determined to be an abnormal power-consuming device when the remaining electric power of the terminal electronic device 11 is outside of this reference range.

The first threshold and/or the second threshold may be set and/or adjusted according to the application scenario. The first threshold and the second threshold may be the same value or different values. In addition, the first threshold and the second threshold may be taken as a magnitude of electric power (e.g., they may be expressed in unit of voltage), but they may also be taken as a percentage of electric power. As a non-limiting example, the first threshold may be a value that is 10% greater than the average value of the remaining electric power of the terminal electronic devices 11, and the second threshold may be a value that is 10% less than the average value.

Figure 6:
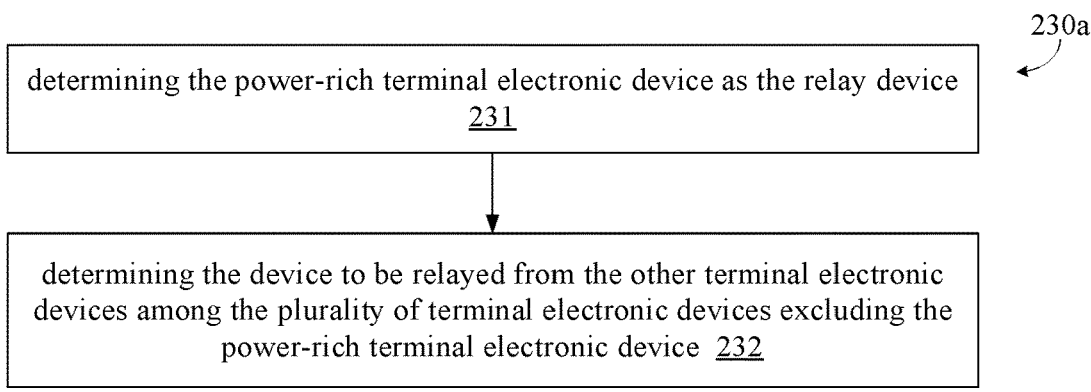
FIG. 6 schematically shows a method for determining a relay device and a device to be relayed in the power balance processing method shown in FIG. 3 in the form of a flowchart.
Figure 7:
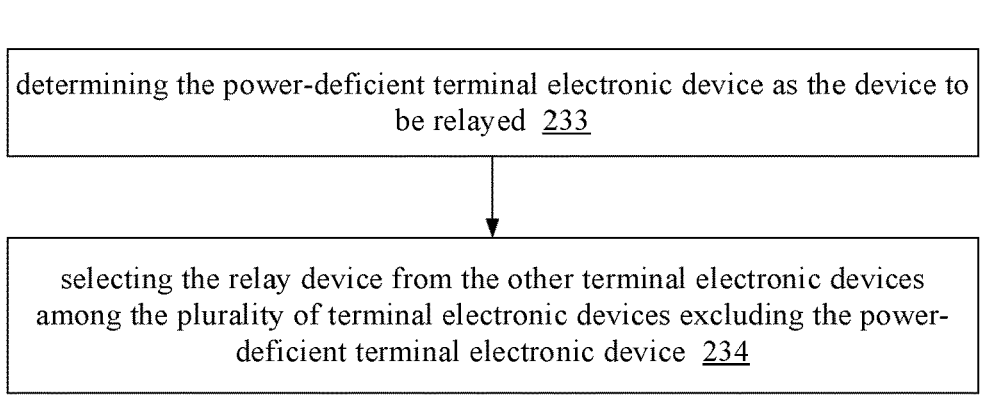
FIG. 7 schematically shows another method for determining a relay device and a device to be relayed in the power balance processing method shown in FIG. 3 in the form of a flowchart.

With continued reference to FIG. 3, the electric power balance processing method 200 determines the relay device and the device to be relayed from the plurality of terminal electronic devices in step 230 based on the abnormal power-consuming device. As already detailed earlier, a power-rich terminal electronic device or a power-deficient terminal electronic device may be determined as an abnormal power-consuming device based on different thresholds, and for the two situations, the manners for determining the relay device and the device to be relayed in the electric power balance processing method 200 are different. FIGS. 6 and 7 schematically illustrate, in the form of a flowchart, the methods 230a and 230b for determining the relay device and the device to be relayed in step 230 of the electric power balance processing method 200 shown in FIG. 3, respectively.

Referring to FIG. 6 in conjunction with reference to FIG. 4, it shows the method 230a for determining a relay device and a device to be relayed based on the determined power-rich terminal electronic device in step 230 of the electric power balance processing method 200. The method 230a includes steps 231 and 232:

step 231: determining the power-rich terminal electronic device as the relay device;

step 232: determining the device to be relayed from the other terminal electronic devices among the plurality of terminal electronic devices excluding the power-rich terminal electronic device.

As a non-limiting example, the device to be relayed may be determined at step 232 based on at least one of the following conditions: the lowest remaining electric power; the lowest power consumption required for communication with the relay device; the shortest transmission time required for communication with the relay device; and the shortest transmission path required for communication with the relay device. Accordingly, it should be understood that more than one device to be relayed may be determined in the electric power balance processing method 200, as long as the terminal electronic device 11 determined as the device to be relayed satisfies at least one of the above conditions. Further, in a non-limiting example, the above condition regarding the remaining electric power may also be modified to be a range regarding the remaining electric power, such as, but not limited to, a range from a minimum value of the remaining electric power to 120% of that minimum value.

Referring to FIG. 7 in conjunction with reference to FIG. 5, it shows the method 230b for determining a relay device and a device to be relayed based on the determined power-deficient terminal electronic device at step 230 of the electric power balance processing method 200. The method 230*b* includes steps 233 and 234:

step 233: determining the power-deficient terminal electronic device as the device to be relayed;

step 234: determining the relay device from the other terminal electronic devices among the plurality of terminal electronic devices excluding the power-deficient terminal electronic device.

As a non-limiting example, the relay device may be determined in step 234 based on at least one of the following conditions: the highest remaining electric power; the lowest power consumption required for communication with the device to be relayed; the shortest transmission time required for communication with the device to be relayed; and the shortest transmission path required for communication with the device to be relayed. It is readily appreciated that, in a non-limiting example, the condition regarding the remaining electric power may also be modified to be a range regarding the remaining electric power, such as, but not limited to, a range from the maximum value of the remaining electric power to 80% of that maximum value.

Figure 8:
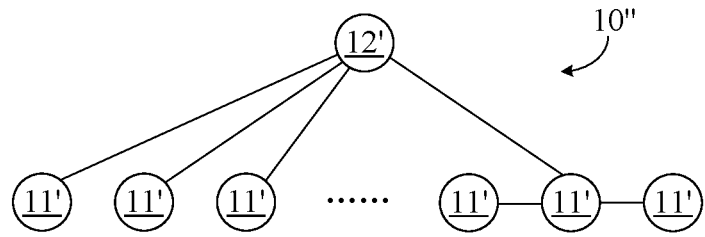
FIG. 8 schematically shows a modified network topology structure of the network system shown in FIG. 1 after applying the power balance processing method shown in FIG. 3.

With continued reference to FIG. 3, the electric power balance processing method 200 uses a relay device to construct a relay transmission channel for data transmission between the device to be relayed and the communication device in step 240. By establishing the relay transmission channel, the electric power balance processing method 200 changes the network topology of the network system 10. As a non-limiting example, FIG. 8 schematically shows one possible modified network topology 10" of the network system 10 after the application of the electric power balance processing method 200. As shown in FIG. 8, and in conjunction with reference to FIG. 2, in the network topology 10", a node 11' is determined as a relay node and two nodes 11' adjacent to the relay node are determined as the nodes to be relayed. The relay node establishes a relay transmission channel for data transmission between the two nodes to be relayed and the central node 12'. In this manner, the electric power balance processing method 200 can eliminate abnormal power-consuming devices in the network system 10 so that the remaining electric power of each terminal electronic device 10 in the network system 10 can be in an electric power balance state.

In a non-limiting embodiment, the abnormal power-consuming device may also be an abnormal power-consuming device determined within each terminal electronic device group after all terminal electronic devices 11 in the network system 10 are divided into different terminal electronic device groups according to predetermined conditions. As a non-limiting example, the predetermined conditions may be different geographical locations, different rooms, different commodity shelves, etc. In each determination of an abnormal power-consuming device from a terminal electronic device group, one or more relay devices and the devices to be relayed and corresponding to the relay devices are selected from a plurality of terminal electronic devices of the terminal electronic device group. The manner of selecting the relay device and the device to be relayed can be realized by using corresponding methods according to the two cases respectively shown in the two sets of figures of FIG. 4 and FIG. 6 as well as FIG. 5 and FIG. 7.

For the first case shown in FIG. 4 and FIG. 6, a power-rich terminal electronic device is determined as an abnormal power-consuming device from a plurality of terminal electronic devices, the power-rich terminal electronic device is determined as a relay device, and then a device to be relayed corresponding to the relay device is determined. The device to be relayed can be determined based on at least one of the following conditions, which include: the lowest remaining electric power; the lowest power consumption required for communication with the relay device; the shortest transmission time required for communication with the relay device; and the shortest transmission path required for communication with the relay device. Thus, it should be understood that more than one device to be relayed may be determined, as long as the terminal electronic device determined as the device to be relayed satisfies at least one of the above conditions.

Further, it is readily understood that, in a non-limiting example, the condition regarding the remaining electric power may also be modified to be a range regarding the remaining electric power, such as, but not limited to, from a minimum value of the remaining electric power to 120% of that minimum value. When a plurality of relay devices are determined in the network system, the plurality of relay devices may first be divided into a plurality of level groups according to the energy consumption level principle, each level group comprising at least one relay device; and then a device to be relayed corresponding to each level group is selected. The level groups may be determined based on the ranking results of the remaining electric power of the determined relay devices, or may be determined based on the distances of the determined relay devices from the communication device, or may be divided into level groups based on any other suitable requirements. Each level group may include one relay device or may include a plurality of relay devices. Where the level group includes a plurality of relay devices, the relationship of the plurality of relay devices may be cascaded or parallel, or both relationships may exist.

For the second case shown in FIG. 5 and FIG. 7, the power-deficient terminal electronic device is determined as an abnormal power-consuming device from a plurality of terminal electronic devices, the power-deficient terminal electronic device is determined as a device to be relayed, and then a relay device corresponding to the device to be relayed is determined.

The relay device may be a terminal electronic device having the highest remaining electric power, or a terminal electronic device having a remaining electric power much higher than the average remaining electric power, or a terminal electronic device having a difference between the remaining electric power thereof and the average remaining electric power greater than zero and the absolute value of the difference greater than or equal to a certain threshold; or after determining the device to be relayed, the relay device is determined according to at least one of the following conditions, which include: the highest remaining electric power; the lowest power consumption required for communication with the device to be relayed; the shortest transmission time required for communication with the device to be relayed; and the shortest transmission path required for communication with the device to be relayed. Alternatively, the relay device corresponding to the device to be relayed is selected based on the update frequency of the terminal electronic device. For example, if the terminal electronic device's downlink data does not need to be updated in a certain time range, the terminal electronic device can be determined as a relay device. Another example is that in the electronic tag system, a ward bed is assigned to a certain patient, the patient's hospitalization time is 1 month, and the electronic tag corresponding to the ward bed does not need to update the downlink data within 1 month, and then the electronic tag can be used as a relay device corresponding to a device to be relayed.

Thus, as described above, when the presence of an abnormal power-consuming device is detected, the abnormal power-consuming device may be determined as a relay device or a device to be relayed.

After each determination of a relay device, a device to be relayed corresponding to each relay device may be determined in accordance with the above conditions; or, after determining a device to be relayed, a relay device corresponding to each device to be relayed may be determined in accordance with the above conditions. The case of multiple relay devices as described previously may also exist when determining a relay device, and the corresponding relationship of a relay device and a device to be relayed may be determined with reference to the above processing manners.

The following is a detailed description of how to balance the remaining electric power of each terminal electronic device 11, taking the network system 10 as an example. As described previously, the network system 10 includes a communication device 12 and a plurality of terminal electronic devices 11. For ease of description, these terminal electronic devices 11 are also referred to as terminal electronic devices {A, B, C, D, E, F, G, H} in the following.

At moment t1, the average value of the remaining electric power of the network system 10 at moment t1 is calculated, and a first threshold and a second threshold as described above are set based on the average value. The remaining electric power of each terminal electronic device is compared with the above-mentioned thresholds to determine an abnormal power-consuming device A in the network system 10. For example, the remaining electric power of the abnormal power-consuming device A is greater than the first threshold value.

The abnormal power-consuming device A is determined as a relay device, and then a device to be relayed corresponding to the relay device can be determined according to the conditions described hereinabove. Based on the relay device and the device to be relayed as determined, a corresponding relay transmission channel can be constructed.

At moment t2, the average value of the remaining electric power of the network system 10 at moment t2 is calculated, and the first threshold and the second threshold are reset based on the average value. The remaining electric power of each terminal electronic device is compared with the reset first and second thresholds to determine an abnormal power-consuming device D in the network system 10. For example, the remaining electric power of the abnormal power-consuming device D is less than the second threshold.

The abnormal power-consuming device D is determined as a device to be relayed, and then a relay device corresponding to the device to be relayed can be determined based on the conditions described hereinabove. Based on the relay device and the device to be relayed, a corresponding relay transmission channel can be reconstructed.

At moment t2, the average value of the remaining electric power of the network system 10 at moment t3 is calculated, and the first threshold and the second threshold are reset based on the average value. The remaining electric power of each terminal electronic device is compared with the reset first and second thresholds to determine whether the remaining electric power of each terminal electronic device in the network system 10 is abnormal. For example, at moment t3, for the abnormal power-consuming device A, its remaining electric power is less than the first threshold and greater than the second threshold at moment t3, i.e., the remaining electric power of the abnormal power-consuming device A is in a balance state at moment t3; and for the abnormal power-consuming device D, its remaining electric power is compared with the first threshold and the second threshold at moment t3, and since its remaining electric power is still less than the second threshold, it can be considered that the remaining electric power of the abnormal power-consuming device D is still in the abnormal state. Therefore, at moment t3, since the remaining electric power of the abnormal power-consuming device A is already in the balance state, the relay transmission channel constructed by the abnormal power-consuming device A as the relay device can be released at this time. In the present disclosure, for each abnormal terminal electronic device 11, it is independently determined whether its remaining electric power is in the balance state of the network system 10, and the relay transmission channel corresponding to the abnormal terminal electronic device is independently released when the remaining electric power of each abnormal terminal electronic device 11 is in the balance state, respectively. The determination of each abnormal power-consuming device and the construction and release process of the corresponding relay transmission channel are independently determined without interference with each other.

Further, for example, at moment tN, the average value of the remaining electric power of the network system 10 at moment tN is calculated, and the first threshold and the second threshold are reset based on this average value. The remaining electric power of each terminal electronic device 11 is compared to the reset first threshold and second threshold to determine that there are the abnormal terminal electronic devices A and B in the network system 10 and that the remaining electric power of each of the terminal electronic devices A and B is greater than the first threshold.

If the remaining electric power of the terminal electronic device A is different from that of the terminal electronic device B, for example, the remaining electric power of the terminal electronic device A is greater than the remaining electric power of the terminal electronic device B, the terminal electronic devices A and B can first be selected as a level group {A, B} of relay devices, and a device C to be relayed corresponding to the level group is selected. For example, the device C to be relayed may be the terminal electronic device with the lowest remaining electric power in the network system 10. Of course, it is also possible to select a suitable terminal electronic device from the network system 10 as the device to be relayed corresponding to the level group according to the aforementioned conditions.

In this case, the device C to be relayed can upload uplink data to the relay device B, the relay device B can continue to upload such uplink data to the relay device A, the relay device A can continue to upload such uplink data to the communication device 12, which can then send such uplink data to the server 13; furthermore, the server 13 can also send downlink data to the communication device 12, the communication device 12 can send downlink data directly to the device C to be relayed, or the communication device 12 can send downlink data to the device C to be relayed via the relay transmission channel formed by the cascaded relay devices A and B as described above.

If the remaining electric power of each of the terminal electronic devices A and B is the same, the terminal electronic devices A and B can also be used as a level group {A, B} of relay devices, and the device C to be relayed corresponding to the level group is selected.

The device C to be relayed may upload uplink data to the relay device A or the relay device B according to the upload period and switch between the relay device A and the relay device B according to the upload period, in order to consume the remaining electric power of the relay devices A and B in a balanced manner. Alternatively, for terminal electronic devices A and B, if the remaining electric power of the terminal electronic device A is less than the above-mentioned second threshold and the remaining electric power of the terminal electronic device B is also less than the above-mentioned second threshold, the terminal electronic devices A and B, which are abnormal power-consuming devices, may be determined as the devices to be relayed, and then the relay device(s) corresponding to the devices to be relayed may be independently determined, respectively.

It should be understood that for the case that more than one relay device is determined, it is possible to construct a relay transmission channel by directly cascading these relay devices or switching them in turn. That is, in this case, In this case, it is not necessary to make these relay devices as a level group.

At moment tM, the average value of the remaining electric power of the network system 10 at moment tM is calculated, and the first threshold and the second threshold are reset based on the average value. The remaining electric power of each terminal electronic device is compared with the reset first and second thresholds to determine whether there is an abnormality in the remaining electric power of each terminal electronic device in the network system 10. For example, when the remaining electric power of the terminal electronic device A is within the range defined by the first threshold and the second threshold at moment tM, the remaining electric power of the terminal electronic device A is considered to be in the balance state at moment tM, i.e., the remaining electric power of the abnormal power-consuming device reaches the balance value, and the relay transmission channel corresponding to the abnormal power-consuming device A is released at this time. For the terminal electronic device B, it is necessary to independently determine whether its remaining electric power reaches the balance value at time tM. If the remaining electric power of the terminal electronic device B reaches the balance value at time tM, the relay transmission channel corresponding to the abnormal power-consuming device B is released. If the remaining electric power of the terminal electronic device B does not reach the balance value at the moment tM, the terminal electronic device B can continue to transmit data through the relay transmission channel. In the present disclosure, it is independently determined whether the remaining electric power of each abnormal terminal electronic device reaches the balance value, and the determination processes for different terminal electronic devices do not interfere with each other.

In the electric power balance processing method provided according to the exemplary embodiments of the present disclosure, the presence of an abnormal power-consuming device in the network system is dynamically determined based on the remaining electric power of the terminal electronic device, and when an abnormal power-consuming device exists, a relay device and a device to be relayed are determined from a plurality of terminal electronic devices based on the determined abnormal power-consuming device; and, the relay device is used to construct a relay transmission channel for data transmission between the device to be relayed and the communication device. As a result, the electric power balance processing method can effectively extend the service life of the entire network system by changing the network topology of the network system.

Figure 9:
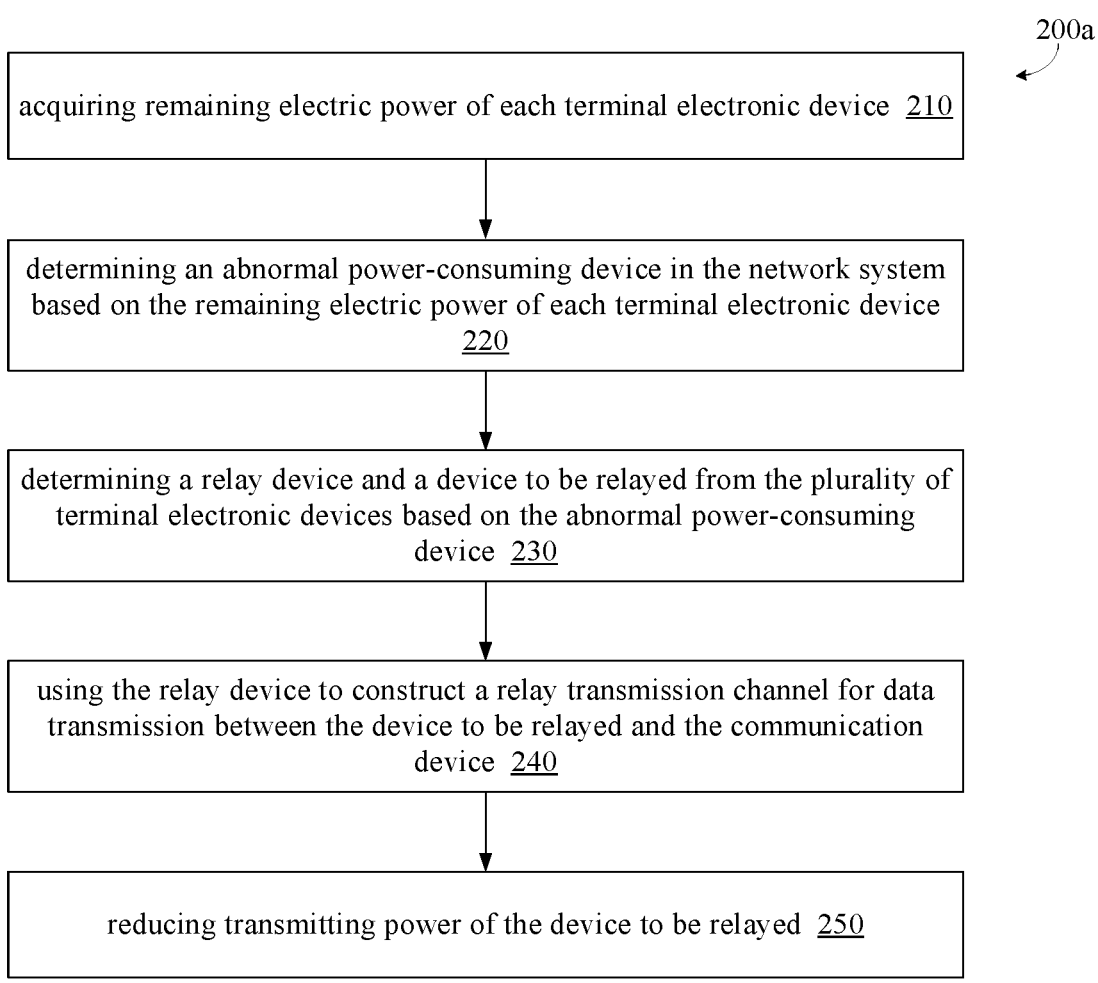
FIG. 9 schematically shows another power balance processing method provided according to an exemplary embodiment of the present disclosure in the form of a flowchart.

Referring to FIG. 9 below, it shows, in the form of a flowchart, another electric power balance processing method 200a provided in accordance with an exemplary embodiment of the present disclosure. The electric power balance processing method 200a shown in FIG. 9 is similar to the electric power balance processing method 200 shown in FIG. 3, except that the electric power balance processing method 200a shown in FIG. 9 further includes step 250:

step 250: reducing transmitting power of the device to be relayed.

It should be understood that the steps of the electric power balance processing method 200a shown in FIG. 9 that are identical to the steps of the electric power balance processing method 200 shown in FIG. 3 may refer to the relevant description above, and only the steps that differ from those of the electric power balance processing method 200 will be described hereinafter.

As shown in FIG. 9, the electric power balance processing method 200a further includes a step of reducing the transmitting power of the device to be relayed in addition to constructing a relay transmission channel for data transmission between the device to be relayed and the communication device using the relay device. As a non-limiting example, the electric power balance processing method 200a may, after constructing the relay transmission channel, send a first control instruction to the device to be relayed to instruct to reduce the transmitting power of the device to be relayed. For example, the transmitting power used by the device to be relayed prior to constructing the relay transmission channel may be the current transmitting power, then reducing the transmitting power of the device to be relayed means using a lower transmitting power than the current transmitting power so that the lower transmitting power can be used to send data to the relay device, which in turn sends that uplink data via the relay device to the communication device, which then sends that uplink data to the server. In related technologies, the terminal electronic device requires a certain amount of transmitting power to complete each uplink data uploading. For example, when the terminal electronic device is an active electronic tag, the active electronic tag needs to use the transmitting power of the amount of the tag transmitting power to send data when uploading the uplink data, so the power is consumed fast. In contrast to the related technology, the present disclosure can also enable the terminal electronic device as a device to be relayed to send data by using a lower transmitting power in the case of a new relay transmission channel being constructed, which effectively reduces the power consumption of the terminal electronic device and thus extends the life cycle of the entire network system.

In another exemplary embodiment of the present disclosure, after the relay device and the device to be relayed are determined from the plurality of terminal electronic devices, a first control instruction may be sent to the device to be relayed to reduce the transmitting power, so that the device to be relayed can send data to the relay device with a lower transmitting power, and the relay device can forward the uploaded uplink data to the communication device; in addition, the communication device can directly send downlink data to the device to be relayed, or the communication device may also send downlink data to the device to be relayed via the relay device.

In the network system of the related technologies, each terminal electronic device is used at a different frequency, which results in different power consumption of each terminal electronic device. The current related technologies only consider the low power consumption of the terminal electronic device itself, and extend its lifespan by reducing the power consumption of the terminal electronic device itself, which may lead to a large difference between the remaining electric power of some terminal electronic devices in the network system, and then may make the service life of the entire network system shorter. The electric power balance processing method provided according to the exemplary embodiments of the present disclosure changes the network topology of the network system while reducing the transmitting power of the device to be relayed, which can effectively reduce the power consumption speed of the entire network system, and make its service life be extended.

In a non-limiting embodiment, after acquiring the remaining electric power uploaded by all terminal electronic devices, the remaining electric power of the terminal electronic devices can be sorted, and the remaining electric power is compared with the average remaining electric power, and then, whether there are abnormal power-consuming devices in the network system 10 is determined based on the difference between the remaining electric power and the average remaining electric power. When there are abnormal power-consuming devices, the relay device and the device to be relayed are selected to extend the service life of the entire network system. The selection method is the same as that described in step 230 in FIG. 3.

Taking the network system 10 shown in FIG. 1 as an example, the electric power balance processing method according to the exemplary embodiment of the present disclosure treats the plurality of terminal electronic devices 11 included in the network system 10 as a whole, whereby the average remaining electric power of the plurality of terminal electronic devices can be dynamically calculated, a reference range is dynamically set by using this average remaining electric power as a reference. The remaining electric power acquired from each terminal electronic device 11 is compared with the average remaining electric power corresponding to each moment. When the remaining electric power of a terminal electronic device 11 is outside the above-mentioned reference range at a certain moment, the terminal electronic device 11 is determined as an abnormal power-consuming device, and the relay device and the device to be relayed are determined based on the determined abnormal power-consuming device. For example, if at a certain moment, a terminal electronic device 11 has a remaining electric power of 40%, an average remaining electric power is 30%, and a first threshold is 35%, the terminal electronic device 11 can be determined as a power-rich terminal electronic device and can be determined as a relay device, while a terminal electronic device 11 has a remaining electric power of 20%, an average remaining power is 30%, and a second threshold is 25%, then the terminal electronic device 11 can be determined as a power-deficient terminal electronic device and it can be determined as a device to be relayed.

After the device to be relayed is determined, a relay device corresponding to the device to be relayed can be determined. For example, a relay device can be determined from the remaining plurality of terminal electronic devices 11 based on the shortest transmission time to the device to be relayed. In another non-limiting example, based on the remaining electric power of the remaining terminal electronic devices 11, the terminal electronic device 11 with the highest remaining electric power may be used as the relay device.

Alternatively, at a certain moment, when the difference between the remaining electric power of a terminal electronic device 11 and the average remaining electric power at that moment is greater than zero and the remaining electric power of that terminal electronic device 11 is greater than a first threshold, the terminal electronic device 11 may be directly determined as a power-rich terminal electronic device and may be determined as a relay device. Then, a device to be relayed is determined from the remaining terminal electronic device 11. A plurality of devices to be relayed are possible. For example, if some of the remaining terminal electronic devices have the same electric power level and their remaining electric power is low, the relay device may be used as a relay transmission channel for communication between these devices to be relayed and the communication device in order to achieve an electric power balance of the entire network system to extend its service life.

Figure 10:
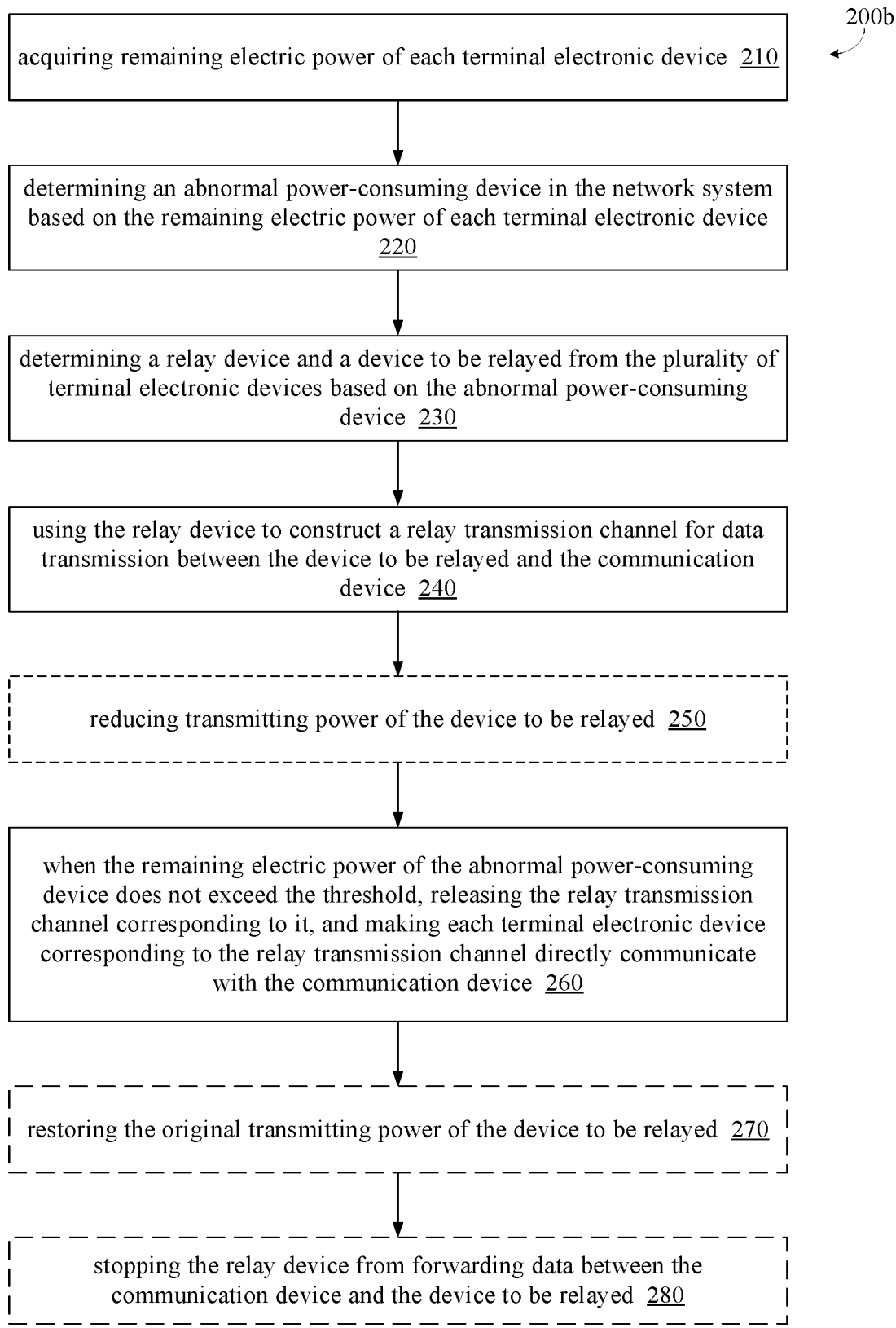
FIG. 10 schematically shows in the form of a flow chart an electric power balance processing method provided according to an exemplary embodiment of the present disclosure, which shows the processing of the power balance processing method when the electric power of the network system is in a balanced state.

Next, referring to FIG. 10, it shows the process of the electric power balance processing method 200b when the remaining electric power of each terminal electronic device in the network system 10 reaches a balanced state. The remaining electric power of each terminal electronic device 11 of the network system 10 reaching a balance state means that the remaining electric power of each terminal electronic device 11 in the network system 10 is maintained at the same level, and the same level means that the remaining electric power of each terminal electronic device 11 in the network system 10 is considered to be the same within a certain threshold range. The same level is approximately the same, for example, within the fluctuation range of the average remaining electric power. The value of the fluctuation range can be determined according to the accuracy of the remaining electric power calculation.

Please referring to FIG. 10, it schematically shows an electric power balance processing method 200b provided according to an exemplary embodiment of the present disclosure in the form of a flowchart. The electric power balance processing method 200b may include the following steps:

step 210: acquiring the remaining electric power of each terminal electronic device;

step 220: determining an abnormal power-consuming device in the network system based on the remaining electric power of each terminal electronic device;

step 230: determining a relay device and a device to be relayed from a plurality of terminal electronic devices based on the abnormal power-consuming device;

step 240: using the relay device to construct a relay transmission channel for data transmission between the device to be relayed and the communication device;

step 260: when the remaining electric power of the abnormal power-consuming device does not exceed the threshold, releasing the relay transmission channel corresponding to it, and making each terminal electronic device corresponding to the relay transmission channel directly communicate with the communication device.

Optionally, the electric power balance processing method 200b may further include:

step 250: reducing the transmitting power of the device to be relayed.

And optionally, when step 250 is included, the electric power balance processing method 200b may further include: step 270, restoring the original transmitting power of the device to be relayed.

And, the electric power balance processing method 200b may further include:

step 280: stopping the relay device from forwarding data between the communication device and the device to be relayed.

In the above steps, for the steps that are the same as the steps in the electric power balance processing method 200 shown in FIG. 3 and the electric power balance processing method 200a shown in FIG. 9, please refer to the corresponding detailed description hereinabove.

After the plurality of terminal electronic devices 11 undergo the processing of steps 210-250, the remaining electric power of each terminal electronic device 11 approaches the average remaining electric power of the plurality of terminal electronic devices 11 in the network system 10. When it is at the same level, it can be considered that the remaining electric power of each terminal electronic device 11 is approximately the same, that is, it means that the remaining electric power of each terminal electronic device 11 in the network system 10 has reached a balance state.

When the remaining electric power of each abnormal power-consuming device reaches the balance value, the relay transmission channel corresponding to each abnormal power-consuming device can be released, and the corresponding relay device and the device to be relayed can directly communicate with the communication device 12. That is, for each abnormal power-consuming device, the electric power balance processing method provided according to the exemplary embodiment of the present disclosure independently determines whether it reaches the balance value of the network system 10, and the determination processes do not interfere with each other. When the remaining electric power of an abnormal power-consuming device reaches the balance value of the network system 10, the relay transmission channel corresponding to the abnormal power-consuming device is released. For the abnormal power-consuming devices whose remaining electric power has not reached the balance value, the corresponding relay transmission channel will continue to be used for data transmission.

The original communication transmission channel is based on the network topology initially established by the network system 10. For example, based on the star network topology shown in FIG. 2, wherein the communication device 12 and each terminal electronic device 11 directly establish an uplink channel for transmitting uplink data, and directly establish a downlink channel for transmitting downlink data, that is, the data transmission channels are constructed between the communication device 12 and the plurality of terminal electronic devices 11 based on the initial star network topology. When there are abnormal power-consuming devices in the network system 10, the electric power balance processing method according to an exemplary embodiment of the present disclosure constructs a relay transmission channel, changes the initial network topology, and/or reduces the transmitting power of the device to be relayed, in order to achieve the electric power balance of the entire network system, thereby extending its service life. When the remaining electric power of the abnormal power-consuming device reaches the balance value, the relay transmission channel corresponding to the abnormal power-consuming device can be released. After the relay transmission channel is released, the second control instruction can also be sent to the device to be relayed. The second control instruction can be used to notify the device to be relayed to restore its original transmitting power. In addition, a third control instruction may be sent to the relay device, and the third control instruction may be used to notify the relay device to stop forwarding data between the device to be relayed and the communication device. Notifying the device to be relayed to restore its original transmitting power means that when the remaining electric power of the abnormal power-consuming device reaches the balance value, the communication device can send a second control instruction to the device to be relayed to notify the device to be relayed to restore the transmitting power used before the relay transmission channel was constructed.

The electric power balance processing method according to the exemplary embodiment of the present disclosure realizes the electric power balance of each terminal electronic device in the entire network system by establishing the relay transmission channel(s), and when the remaining electric power of the abnormal power-consuming device reaches the balance value, releasing the corresponding relay transmission channel(s) and restoring the transmitting power of the device(s) to be relayed, thereby effectively extending the service life of the entire network system.

In order to understand the present disclosure more clearly, an electronic tag system applied to a bedside card in a hospital will be taken as an example and described in detail with reference to FIG. 11 and FIG. 12. It should be understood that the hospital bedside card electronic tag system shown and described below is only an exemplary embodiment for explaining the present disclosure, and it does not constitute any limitation to the present disclosure. Please referring to FIG. 11, it schematically shows the structure of a hospital bedside card electronic tag system provided according to an exemplary embodiment of the present disclosure.

The hospital bedside card electronic tag system 500 may include a plurality of bedside card electronic tags 501 and one or more gateway devices 502, as well as a server 503. Among them, the server 503 can be used to send user data to the gateway device 502, and the gateway device 502 then sends the user data (ie, downlink data) to the bedside card electronic tag 501. After the bedside card electronic tag 501 receives the user data, the screen can be refreshed to display corresponding information. As a non-limiting example, the bedside card electronic tag 501 may include a controller, a wireless communication module, an electronic ink (E-Ink) screen, an electric power management circuit, a battery, and so on.

In a hospital application scenario, each room can contain a plurality of beds, and each bed is provided with a bedside card electronic tag 501, which can be used to display the patient's name, age, hospitalization reason, hospitalization date, attending doctor and other information.

The network topology of the network system initially constructed by the plurality of bedside card electronic tags 501 is a star topology network, that is, the central node is the gateway device 502, and each bedside card electronic tag 501 is a sub-node. In a normal working state, the gateway device 502 and the plurality of bedside card electronic tags 501 can realize point-to-point two-way communication, that is, the gateway device 502 can separately establish an uplink channel and a downlink channel with each bedside card electronic tag 501 to achieve the transmission of uplink data and downlink data. For example, the bedside card electronic tag 501 uploads uplink data to the gateway device 502 through an uplink channel, and the gateway device 502 sends downlink data to the bedside card electronic tag 501 through a downlink channel. When the communication distance between the bedside card electronic tag 501 and the gateway device 502 is relatively long, the bedside card electronic tag 501 requires a large transmitting power. When the bedside card electronic tag 501 is in the transmitting state, it consumes more electric power.

When the difference between the remaining power of the bedside card electronic tags 501 in a region is large, the overall service life of the bedside card electronic tags in this area is likely to be shortened. For example, a plurality of bedside card electronic tags are provided in a ward at the same time, that is, the same batch of bedside card electronic tags. However, during usage, the bedside card electronic tags of some beds are used more frequently, and the electric power thereof is consumed fast, and the bedside card electronic tags of some beds are used less frequently, and the electric power thereof is consumed slowly. The bedside card electronic tag, whose electric power is consumed fast, determines that the overall service life of the bedside card electronic tags of this batch is too short.

In order to solve this problem, according to an exemplary embodiment of the present disclosure, a gateway device can be used to monitor the remaining electric power of the batteries of the bedside card electronic tags in the area. When detecting that the bedside card electronic tag with abnormal electric power exists in the area, the bedside card electronic tag with the abnormal electric power can be balanced by the electric power balance processing method according to the present disclosure. For example, when the remaining electric power of the bedside card electronic tag with the abnormal electric power is higher than the average remaining electric power of the bedside card electronic tags in the area, and the difference between the remaining electric power and the average remaining electric power is greater than the first threshold, the bedside card electronic tag with the abnormal electric power may be used as the relay device in the area. The relay device is used to establish a relay transmission channel for the bedside card the electronic tag with remaining electric power lower than the average remaining electric power. In another non-limiting example, a first control instruction can also be sent to the bedside card the electronic tag with remaining electric power lower than the average remaining electric power (for example, the gateway device can directly send the first control instruction to the bedside card electronic tag with remaining electric power lower than the average remaining electric power) to reduce the transmitting power of the bedside card electronic tag with remaining electric power lower than the average remaining electric power, thereby saving its battery power, and extending the service life of the bedside card electronic tags in the entire area. For example, the transmitting power of the bedside card electronic tag with remaining electric power lower than the average remaining electric power can be reduced from 20 dBm to 0 dBm, so that the required electric power is reduced accordingly.

Figure 11:
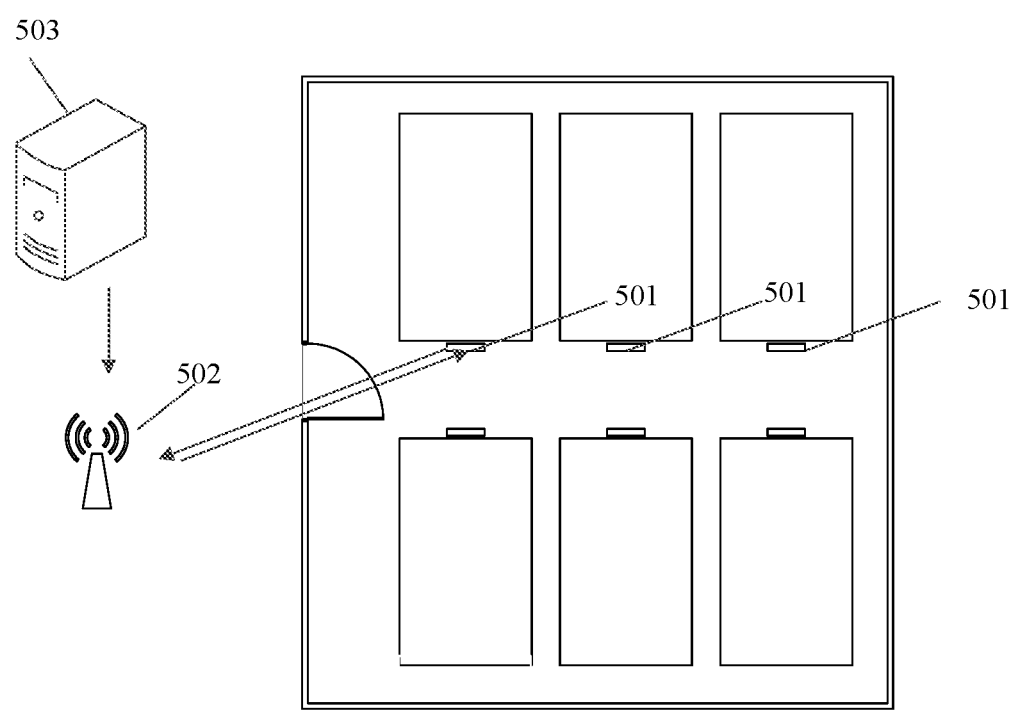
FIG. 11 schematically shows the structure of a hospital bedside card electronic tag system provided according to an exemplary embodiment of the present disclosure.
Figure 12:
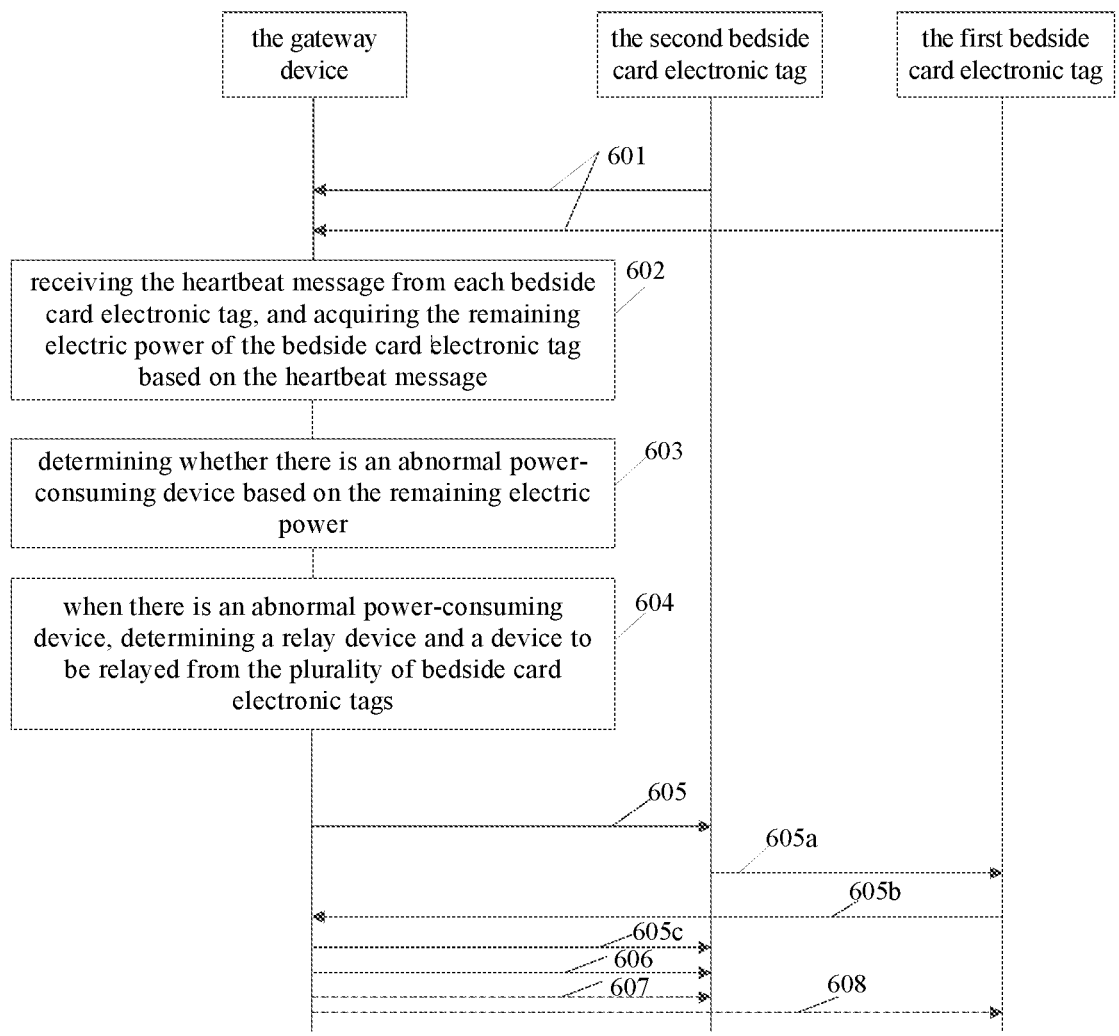
FIG. 12 schematically shows a process of applying the electric power balance processing method according to the present disclosure to the hospital bedside card electronic tag system shown in FIG. 11.

On the basis of FIG. 11, please refer to FIG. 12, which shows an exemplary process of applying the electric power balance processing method according to the present disclosure to the hospital bedside card electronic tag system 500 shown in FIG. 11: step 601: each bedside card electronic tag uploads a heartbeat message to the gateway device;

step 602: the gateway device receives the heartbeat message from each bedside card electronic tag, and acquires the remaining electric power of the bedside card electronic tag based on the heartbeat message;

step 603: determining whether there is an abnormal power-consuming device based on the remaining electric power;

step 604: when there is an abnormal power-consuming device, determining a relay device and a device to be relayed (also referred to as a first bedside card electronic tag and a second bedside card electronic tag) from the plurality of bedside card electronic tags.

As a non-limiting example, in the above steps, the gateway device receives the heartbeat message of the bedside card electronic tag, and can determine the remaining electric power of each bedside card electronic tag according to the received heartbeat message. When the difference between the remaining electric power of a certain bedside card electronic tag and the average remaining electric power of the bedside card electronic tags in the same room is greater than a first threshold P1, the gateway device will determine the bedside card electronic tag as a relay device, and from all the remaining bedside card electronic tags in this room, determine the device to be relayed. The uplink data uploaded by the device to be relayed is transmitted to the gateway device via the relay device.

Similarly, when it is determined that the remaining electric power of the bedside card electronic tag is lower than that of the other bedside card electronic tags in the same room, for example, the remaining electric power of other bedside card electronic tags in the room is 30%-40%, and the remaining electric power of the bedside card electronic tag is only 20%, and when the difference between the remaining electric power of the bedside card electronic tag and the average remaining electric power of all the bedside card electronic tags in the same room is greater than a second threshold P2, then the bedside card electronic tag is determined as the device to be relayed. Then, the gateway device will determine a bedside card electronic tag from all the remaining bedside card electronic tags in this room as a relay device, and the uplink data uploaded by the device to be relayed is transmitted to the gateway device via the relay device.

Thus, through the relay device, a new relay transmission channel is formed between the device to be relayed and the gateway device, so that the electric power of the bedside card electronic tag with abnormal remaining electric power can reach the balance value again, thereby extending the service life of the bedside card electronic tag system of the whole room. The first threshold P1 and/or the second threshold P2 can be set according to actual application scenarios, for example, the threshold is set to 10% for the same room. In addition, the corresponding the bedside card electronic tag can be determined as the relay device and/or the device to be relayed according to the conditions described above.

step 605: the gateway device sends the first control instruction to the second bedside card electronic tag, and the first control instruction is used to notify the second bedside card electronic tag to reduce the original transmitting power.

step 605a: the second bedside card electronic tag sends uplink data to the first bedside card electronic tag;

step 605b: the first bedside card electronic tag forwards the uplink data sent by the second bedside card electronic tag to the gateway device;

step 605c: the gateway device sends downlink data to the second bedside card electronic tag.

The manner in which the gateway device sends downlink data to the first bedside card electronic tag and the second bedside card electronic tag can always remain unchanged. However, in another non-limiting embodiment, the gateway device may also send downlink data to the first bedside card electronic tag, and the first bedside card electronic tag forwards the downlink data to the second bedside card electronic tag.

Step 606: when the remaining electric power of each bedside card electronic tag reaches the balance value, notify the second bedside card electronic tag to release the relay transmission channel and restore the original uplink channel.

The original uplink channel is used to directly transmit the uplink data uploaded by the second bedside card electronic tag to the gateway device.

Optionally, in step 607, the gateway device sends a second control instruction to the second bedside card electronic tag, and the second control instruction is used to notify the second bedside card electronic tag to restore the original transmitting power.

Optionally, in step 608, the gateway device sends a third control instruction to the first bedside card electronic tag, and the third control instruction is used to notify the first bedside card electronic tag to stop forwarding the uplink data uploaded by the second bedside card electronic tag.

It should be understood that, although the steps of the electric power balance processing method provided according to the exemplary embodiments of the present disclosure are described in a specific order in the above drawings, this does not require or imply that these steps must be performed in the specific order, or all the steps as shown must be performed in order to achieve the desired result. On the contrary, according to requirements, the execution order of the steps included in the electric power balance processing method depicted in the above drawings can be changed; additionally or alternatively, some steps can be omitted, and/or multiple steps can be combined into one step for execution, and/or one step can be decomposed into multiple steps for execution.

Figure 13:
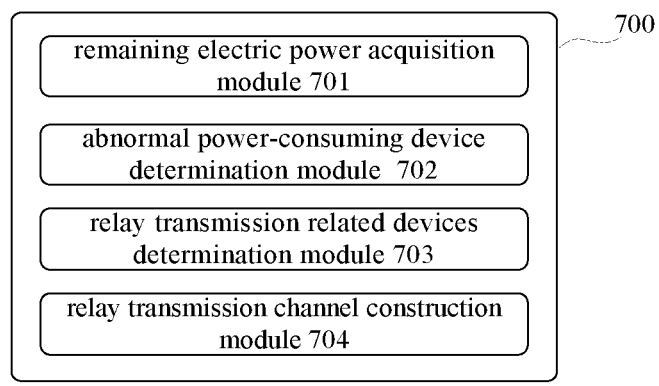
FIG. 13 schematically shows the structure of an electric power balance processing apparatus provided according to an exemplary embodiment of the present disclosure.

Referring to FIG. 13, it schematically shows the structure of an electric power balance processing apparatus 700 provided according to an exemplary embodiment of the present disclosure. The electric power balance processing apparatus 700 can be applied to a network system 10 including a communication device 12 and a plurality of terminal electronic devices 11, wherein each terminal electronic device 11 can communicate with the communication device 12, and the terminal electronic devices 11 can also communicate with each other. The electric power balance processing apparatus 700 may be arranged on the communication device 12, for example, may be implemented by a processor of the communication device 12. The electric power balance processing device 700 may include:

a remaining electric power acquisition module 701 configured to acquire the remaining electric power of each terminal electronic device;

an abnormal power-consuming device determination module 702 configured to determine the abnormal power-consuming device in the network system based on the remaining electric power of each terminal electronic device;

a relay transmission related devices determination module 703 configured to determine a relay device and a device to be relayed from the plurality of terminal electronic devices based on the abnormal power-consuming device; and a relay transmission channel construction module 704 configured to use the relay device to construct a relay transmission channel for data transmission between the device to be relayed and the communication device.

Figure 14:
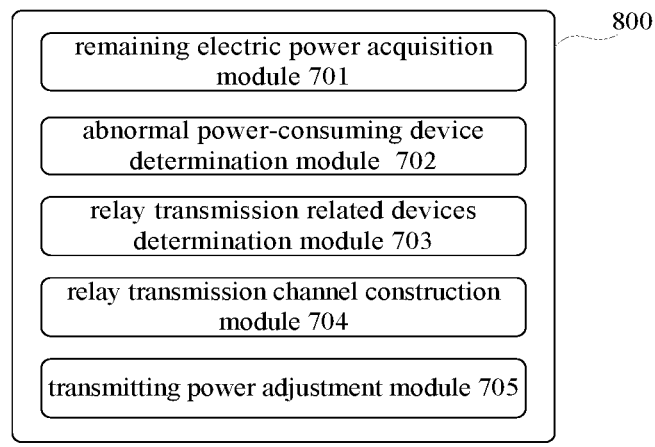
FIG. 14 schematically shows the structure of another electric power balance processing apparatus according to an exemplary embodiment of the present disclosure.

Referring to FIG. 14, it schematically shows the structure of an electric power balance processing apparatus 800 provided according to an exemplary embodiment of the present disclosure. Similarly, the electric power balance processing apparatus 800 can be applied to a network system 10 including a communication device 12 and a plurality of terminal electronic devices 11, wherein each terminal electronic device 11 can communicate with the communication device 12, and the terminal electronic devices 11 can also communicate with each other. The electric power balance processing apparatus 800 may also be arranged on the communication device 12, for example, implemented by the processor of the communication device 12. Compared with the electric power balance processing apparatus 700 shown in FIG. 13, the electric power balance processing apparatus 800 shown in FIG. 14 has a similar structure, the difference is only that the electric power balance processing apparatus 800 further includes: a transmitting power adjustment module 705, which is configured to reduce the transmitting power of the device to be relayed.

Optionally, for the electric power balance processing apparatus 700, 800, the abnormal power-consuming device determination module 702 may further include:

a first threshold determination sub-module, which is configured to determine a first threshold that is greater than the average value of the remaining electric power of each terminal electronic device; and a first determination sub-module, which is configured to determine a power-rich terminal electronic device with a remaining electric power greater than a first threshold among the plurality of terminal electronic devices as an abnormal power-consuming device.

Optionally, for the electric power balance processing apparatus 700, 800, the abnormal power-consuming device determination module 702 may further include:

a second threshold determination sub-module, which is configured to determine a second threshold less than the average value of the remaining electric power of each terminal electronic device; and a second determination sub-module, which is configured to determine a power-deficient terminal electronic device with a remaining electric power less than the second threshold among the plurality of terminal electronic devices as an abnormal power-consuming device.

Optionally, for the electric power balance processing apparatus 700, 800, the relay transmission related devices determination module 703 may further include:

a first selection sub-module, which is configured to determine the power-rich terminal electronic device as a relay device;

a second selection sub-module, which is configured to determine the device to be relayed from the other terminal electronic devices of the plurality of terminal electronic devices excluding the power-rich terminal electronic devices.

Optionally, for the electric power balance processing apparatus 700, 800, the relay transmission related devices determination module 703 may further include:

a third selection sub-module, which is configured to determine the power-deficient terminal electronic device as the device to be relayed;

a fourth selection sub-module, which is configured to select the relay device from the other terminal electronic devices of the plurality of terminal electronic devices excluding the power-deficient terminal electronic device.

The second selection sub-module may determine the device to be relayed based on at least one of the following conditions. These conditions include: the lowest remaining electric power; the lowest power consumption required for communication with the relay device; the shortest transmission time required for communication with the relay device; and the shortest transmission path required for communication with the relay device. It is easy to understand that, in a non-limiting example, the condition regarding the remaining electric power may also be modified to a range regarding the remaining electric power, for example, but not limited to, from the minimum value of the remaining electric power to 120% of the minimum value.

The fourth selection sub-module may determine the relay device based on at least one of the following conditions. These conditions include: the highest remaining electric power; the lowest power consumption required for communication with the device to be relayed; the shortest transmission time required for communication with the device to be relayed; and the shortest transmission path required for communication with the device to be relayed. It is easy to understand that, in a non-limiting example, the condition regarding the remaining electric power may also be modified to a range regarding the remaining electric power, for example, but not limited to, from the maximum value of the remaining power to 80% of the maximum value.

Optionally, for the electric power balance processing apparatus 700, 800, the remaining electric power acquisition module 701 may also be configured to:

receive a heartbeat message from each terminal electronic device;

detect the remaining electric power of each terminal electronic device based on the heartbeat message.

Optionally, the electric power balance processing device 800 may further include:

a relay transmission channel release module, which is configured to release the corresponding relay transmission channel when the remaining electric power of the abnormal power-consuming device does not exceed the threshold, and make each terminal electronic device corresponding to the relay transmission channel directly communicate with communication device;

a transmitting power restoring module, which is configured to restore the original transmitting power of the device to be relayed;

a relay device stopping module, which is configured to stop the relay device from forwarding data between the communication device and the device to be relayed.

It should be understood that each module included in the electric power balance processing apparatus 700, 800 corresponds to each step in the electric power balance processing methods described with reference to FIG. 3 to FIG. 10. Therefore, the operations and features described above for the method are also applicable to the electric power balance processing apparatus 700, 800 and the modules included therein, and will not be repeatedly described here. The corresponding modules in the electric power balance processing apparatus 700, 800 can cooperate with each other to implement the solutions described in the embodiments of the present disclosure.

Several modules or units are mentioned in the detailed description above, but this division is not mandatory. In fact, according to the present disclosure, the features and functions of two or more modules or units described above may be combined into one module or unit. Conversely, the features and functions of one module or unit described above can be further divided into multiple modules or units to be embodied.

Figure 15:
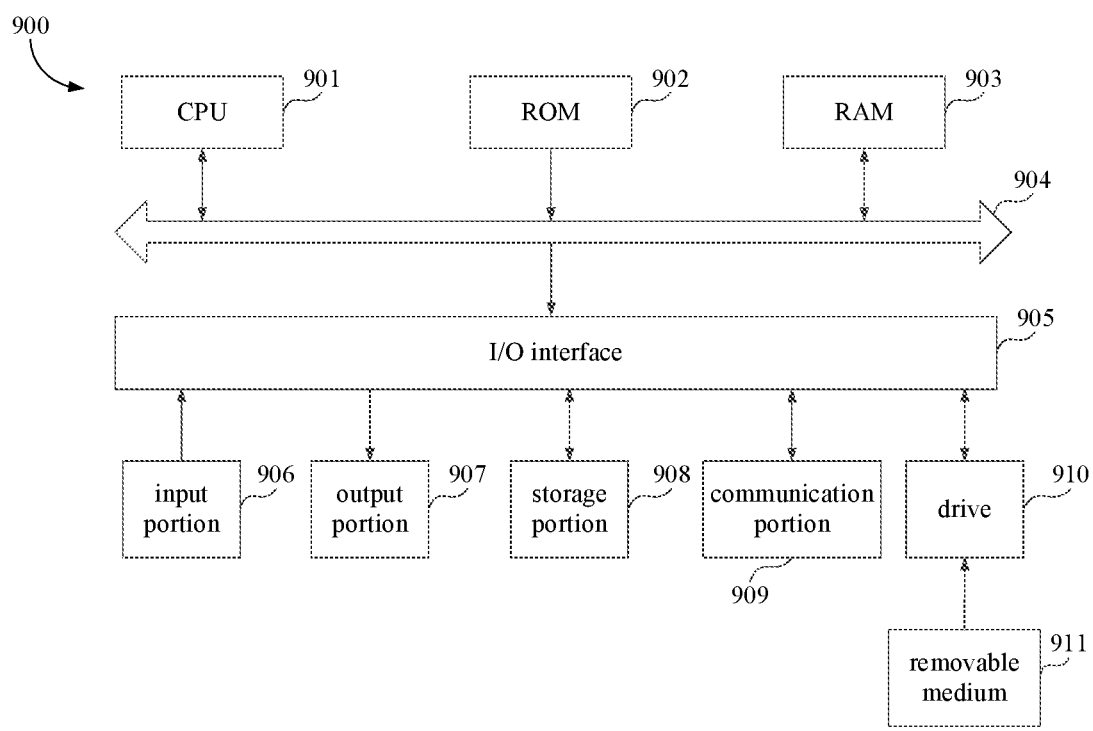
FIG. 15 schematically shows the structure of a computer system that can be used to implement the communication devices provided according to an exemplary embodiment of the present disclosure.

Referring now to FIG. 15, it schematically shows the structure of a computer system 900 suitable for implementing the electric power balance processing method and the electric power balance processing apparatus according to the exemplary embodiments of the present disclosure.

As shown in FIG. 15, the computer system 900 includes a central processing unit (CPU) 901, which can perform various appropriate actions and processing based on a program stored in a read-only memory (ROM) 902 or a program loaded from a storage portion 908 into a random access memory (RAM) 903. Various programs and data required for the operation of the system 900 are also stored in the RAM 903. The CPU 901, the ROM 902 and the RAM 903 are connected to each other through a bus 904. An input/output (I/O) interface 905 is also connected to the bus 904.

The following components are connected to the I/O interface 905: an input portion 906 including a keyboard, a mouse, etc.; an output portion 907 including a cathode ray tube (CRT), a liquid crystal display (LCD), etc., and speakers, etc.; a storage portion 908 including a hard disk, etc.; and a communication portion 909 including a network interface card such as a LAN card, a modem, and the like. The communication portion 909 performs communication processing via a network such as the Internet. The drive 910 is also connected to the I/O interface 905 as required. A removable medium 911, such as a magnetic disk, an optical disk, a magneto-optical disk, a semiconductor memory, etc., is installed on the drive 910 as required, so that the computer program read therefrom is installed into the storage portion 908 as required.

It should be understood that, according to the embodiments of the present disclosure, each of the methods described above with reference to FIG. 3 to FIG. 10 may be implemented as a computer software program. As a non-limiting example, the embodiments of the present disclosure may include a computer program product, which includes a computer program carried on a machine-readable medium, and the computer program contains program codes for executing the methods shown in the flowcharts. In such an embodiment, the computer program may be downloaded and installed from the network through the communication portion 909, and/or installed from the removable medium 911. When this computer program is executed by a processor such as a central processing unit (CPU) 901, the above-mentioned functions defined in the system of the present disclosure are executed.

It should be noted that the computer-readable medium shown in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus or device, or a combination of any of the above. More specific examples of computer-readable storage media may include, but are not limited to: electrical connections with one or more wires, portable computer magnetic disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus or device. In the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the above. The computer-readable signal medium may also be any computer-readable medium other than a computer-readable storage medium. The computer-readable medium may send, propagate, or transmit the program for use by or in combination with the instruction execution system, apparatus or device. The program codes contained on the computer-readable medium can be transmitted by any suitable medium, including but not limited to: wireless, wire, optical cable, RF, etc., or any suitable combination of the above.

The terms used herein are only used to describe the embodiments in the present disclosure, and are not intended to limit the present disclosure. As used herein, the singular forms "a," "an," and "the" are intended to also include the plural forms, unless the context clearly states otherwise. It should also be understood that the terms "including" and "comprising", when used in the present disclosure, refer to the existence of the mentioned features, but do not exclude the existence of one or more other features or the addition of one or more other features. As used herein, the term "and/or" includes any and all combinations of one or more of the associated listed items. It should be understood that although the terms "first", "second", "third", etc. may be used herein to describe various features, these features should not be limited by these terms. These terms are only used to distinguish one feature from another.

Unless otherwise defined, all terms (including technical and scientific terms) used herein have the same meanings as commonly understood by those having ordinary skills in the art to which the present disclosure belongs. It should also be understood that terms such as those defined in commonly used dictionaries should be interpreted as having meanings consistent with their meanings in the relevant field and/or the context of this specification, and will not be interpreted in an idealized or overly formal sense, unless explicitly defined as such herein.

In the description of this specification, the descriptions of the terms "one embodiment", "some embodiments", "examples", "specific examples", or "some examples" etc. mean the specific features, structures, materials or characteristics described in conjunction with the embodiment or example are included in at least one embodiment or example of the present disclosure. In this specification, the schematic representations of the above-mentioned terms are not necessarily directed to the same embodiment or example. Moreover, the described specific features, structures, materials or characteristics can be combined in any one or more embodiments or examples in a suitable manner. In addition, those skilled in the art can combine and assembly the different embodiments or examples and the features of the different embodiments or examples described in this specification without contradicting each other.

The present disclosure describes various techniques in the general contexts of software, hardware, elements or program modules. Generally, these modules include routines, programs, objects, elements, components, data structures, etc. that perform specific tasks or implement specific abstract data types. The terms "module", "function" and "component" used herein generally refer to software, firmware, hardware, or a combination thereof. The features of the technologies described in the present disclosure are platform-independent, which means that these technologies can be implemented on various computing platforms with various processors.

The flowcharts and block diagrams in the drawings illustrate the possible implementation architectures, functions and operations of the systems, methods and computer program products according to various embodiments of the present disclosure. In this regard, each block in the flowcharts or block diagrams may represent a module, program segment, or part of the codes, and the aforementioned module, program segment, or part of the codes contains one or more executable instructions for realizing the specified logic functions. It should also be noted that, in some alternative implementations, the functions indicated in the blocks may also occur in a different order from the order indicated in the drawings. For example, two blocks shown in succession can actually be executed substantially in parallel, and they can sometimes be executed in the reverse order, depending on the functions involved. It should also be noted that each block in the block diagrams and/or flowcharts, and the combination of the blocks in the block diagrams and/or flowcharts, can be implemented by a dedicated hardware-based system that performs the specified functions or operations, or it can be realized by a combination of dedicated hardware and computer instructions.

The units or modules involved in the embodiments described in the present disclosure can be implemented in software or hardware. The described unit or module may also be provided in the processor. For example, it may be described as: a processor includes an acquisition module, a determination module, and a service sending module. The names of these units or modules do not constitute limitations on the units or modules themselves under certain circumstances. For example, the acquisition module can also be described as "a module for acquiring the remaining electric power of a plurality of energy-consuming nodes".

As another aspect, the present disclosure also provides a computer-readable storage medium. The computer-readable storage medium may be included in the electronic device described in the above embodiments; or it may exist separately without being assembled into the electronic device. The aforementioned computer-readable storage medium stores one or more programs, and the aforementioned programs are used by one or more processors to execute the electric power balance processing method described in the present disclosure.

The above description is only an explanation of the specific embodiments of the present disclosure and the applied technical principles. Those skilled in the art should understand that the scope involved in the present disclosure is not limited to the technical solutions formed by the specific combination of the above technical features, and should also cover other technical solutions formed by arbitrarily combinations of the above technical features or the equivalent features thereof without departing from the foregoing disclosed concepts, for example, the technical solutions formed by the interchange of the above-mentioned features and the technical features disclosed in the present disclosure (but not limited thereto) having similar functions.

What is claimed is:

1. An electric power balance processing method applied to a network system comprising a communication device and a plurality of terminal electronic devices, wherein each terminal electronic device is configured to communicate with the communication device, and the terminal electronic devices are configured to also communicate with each other, comprising:

acquiring remaining electric power of each terminal electronic device of the plurality of terminal electronic devices;

determining an abnormal power-consuming device in the network system based on an average value of the remaining electric power of each terminal electronic device of the plurality of terminal electronic devices;

determining a relay device and a device to be relayed from the plurality of terminal electronic devices based on the abnormal power-consuming device; and using the relay device to construct a relay transmission channel for data transmission between the device to be relayed and the communication device.

2. The electric power balance processing method according to claim 1, wherein the determining an abnormal power-consuming device in the network system based on the average value of the remaining electric power of each terminal electronic device of the plurality of terminal electronic devices comprises:
   determining a first threshold that is greater than the average value; and
   determining a power-rich terminal electronic device with remaining electric power greater than the first threshold among the plurality of terminal electronic devices as the abnormal power-consuming device.

3. The electric power balance processing method according to claim 2, wherein the determining a relay device and a device to be relayed from the plurality of terminal electronic devices based on the abnormal power-consuming device comprises:
   determining the power-rich terminal electronic device as the relay device; and
   determining the device to be relayed from the other terminal electronic devices among the plurality of terminal electronic devices excluding the power-rich terminal electronic device.

4. The electric power balance processing method according to claim 2, wherein the determining an abnormal power-consuming device in the network system based on the average value of the remaining electric power of each terminal electronic device of the plurality of terminal electronic devices comprises:
   determining a second threshold that is less than the average value; and
   determining a power-deficient terminal electronic device with remaining electric power less than the second threshold among the plurality of terminal electronic devices as another abnormal power-consuming device.

5. The electric power balance processing method according to claim 4, wherein the determining a relay device and a device to be relayed from the plurality of terminal electronic devices based on the abnormal power-consuming device comprises:
   determining the power-deficient terminal electronic device as the device to be relayed; and
   determining the relay device from the other terminal electronic devices among the plurality of terminal electronic devices excluding the power-deficient terminal electronic device.

6. The electric power balance processing method according to claim 5, wherein the determining the relay device from the other terminal electronic devices among the plurality of terminal electronic devices excluding the power-deficient terminal electronic device comprises:
   the relay device satisfies at least one of the following conditions: the highest remaining electric power; the lowest power consumption required for communication with the device to be relayed; the shortest transmission time required for communication with the device to be relayed; or the shortest transmission path required for communication with the device to be relayed.

7. The electric power balance processing method according to claim 3, wherein the determining the device to be relayed from the other terminal electronic devices among the plurality of terminal electronic devices excluding the power-rich terminal electronic device comprises:
   the device to be relayed satisfies at least one of the following conditions: the lowest remaining electric power; the lowest power consumption required for communication with the relay device; the shortest transmission time required for communication with the relay device; or the shortest transmission path required for communication with the relay device.

8. The electric power balance processing method according to claim 3, wherein the determining an abnormal power-consuming device in the network system based on the average value of the remaining electric power of the plurality of terminal electronic devices comprises:
   determining a second threshold that is less than the average value; and
   determining a power-deficient terminal electronic device with remaining electric power less than the second threshold among the plurality of terminal electronic devices as another abnormal power-consuming device.

9. The electric power balance processing method according to claim 8, wherein the determining a relay device and a device to be relayed from the plurality of terminal electronic devices based on the abnormal power-consuming device comprises:
   determining the power-deficient terminal electronic device as the device to be relayed; and
   determining the relay device from the other terminal electronic devices among the plurality of terminal electronic devices excluding the power-deficient terminal electronic device.

10. The electric power balance processing method according to claim 1, wherein the determining an abnormal power-consuming device in the network system based on an average value of the remaining electric power of each terminal electronic device of the plurality of terminal electronic devices comprises:
    determining a second threshold that is less than the average value; and
    determining a power-deficient terminal electronic device with remaining electric power less than the second threshold among the plurality of terminal electronic devices as the abnormal power-consuming device.

11. The electric power balance processing method according to claim 10, wherein the determining a relay device and a device to be relayed from the plurality of terminal electronic devices based on the abnormal power-consuming device comprises:
    determining the power-deficient terminal electronic device as the device to be relayed; and
    determining the relay device from the other terminal electronic devices among the plurality of terminal electronic devices excluding the power-deficient terminal electronic device.

12. The electric power balance processing method according to claim 11, wherein the determining the relay device from the other terminal electronic devices among the plurality of terminal electronic devices excluding the power-deficient terminal electronic device comprises:
    the relay device satisfies at least one of the following conditions: the highest remaining electric power; the lowest power consumption required for communication with the device to be relayed; the shortest transmission time required for communication with the device to be relayed; or the shortest transmission path required for communication with the device to be relayed.

13. The electric power balance processing method according to claim 1, further comprising:
    reducing transmitting power of the device to be relayed.

14. The electric power balance processing method according to claim 1,
    wherein the determining a relay device and a device to be relayed from the plurality of terminal electronic devices based on the abnormal power-consuming device comprises determining more than one relay device from the plurality of terminal electronic devices, and wherein the using the relay device to construct a relay transmission channel for data transmission between the device to be relayed and the communication device comprises using the more than one relay device to construct the relay transmission channel in a cascaded form.

15. The electric power balance processing method according to claim 1, wherein the determining a relay device and a device to be relayed from the plurality of terminal electronic devices based on the abnormal power-consuming device comprises determining more than one relay device from the plurality of terminal electronic devices, and wherein the using the relay device to construct a relay transmission channel for data transmission between the device to be relayed and the communication device comprises using each relay device among the more than one relay device in turn to construct the relay transmission channel.

16. An electric power balance processing apparatus applied to a network system comprising a communication device and a plurality of terminal electronic devices, wherein each terminal electronic device is configured to communicate with the communication device, and the terminal electronic devices are configured to also communicate with each other, comprising:

a remaining electric power acquisition module configured to acquire the remaining electric power of each terminal electronic device;

an abnormal power-consuming device determination module configured to determine the abnormal power-consuming device in the network system based on an average value of the remaining electric power of each terminal electronic device of the plurality of terminal electronic devices;

a relay transmission related devices determination module configured to determine a relay device and a device to be relayed from the plurality of terminal electronic devices based on the abnormal power-consuming device; and a relay transmission channel construction module configured to use the relay device to construct a relay transmission channel for data transmission between the device to be relayed and the communication device.

17. A network system comprising:

a communication device and a plurality of terminal electronic devices, wherein each terminal electronic device is configured to communicate with the communication device, and the terminal electronic devices are configured to also communicate with each other;

wherein, the communication device is configured to:
acquire remaining electric power of each terminal electronic device;

determine an abnormal power-consuming device in the network system based on an average value of the remaining electric power of each terminal electronic device of the plurality of terminal electronic devices;

determine a relay device and a device to be relayed from the plurality of terminal electronic devices based on the abnormal power-consuming device; and use the relay device to construct a relay transmission channel for data transmission between the device to be relayed and the communication device.

18. The network system according to claim 17, wherein the network system further comprises a server configured to receive data sent by the communication device and transmit server data to the communication device, and wherein the communication device transmits the server data to each terminal electronic device respectively.

19. A computing device comprising a memory and a processor, wherein a computer program that is configured to be run on the processor is stored on the memory, and wherein the computer program, when run by the processor, implements the electric power balance processing method according to claim 1.

20. A non-transitory computer readable storage medium having a computer program stored thereon, wherein the computer program, when run by a processor, implements the electric power balance processing method according to claim 1.

* * * * *